United States Patent [19]
Kanda et al.

[11] Patent Number: 5,668,893
[45] Date of Patent: *Sep. 16, 1997

[54] METHOD FOR DETERMINING ORIENTATION OF CONTOUR LINE SEGMENT IN LOCAL AREA AND FOR DETERMINING STRAIGHT LINE AND CORNER

[75] Inventors: Shinji Kanda; Jun Wakitani; Tsugito Maruyama; Toshihiko Morita, all of Kawasaki, Japan

[73] Assignee: Fujitsu Limited, Kawasaki, Japan

[ * ] Notice: The term of this patent shall not extend beyond the expiration date of Pat. No. 5,586,199.

[21] Appl. No.: 676,512

[22] Filed: Jul. 8, 1996

Related U.S. Application Data

[62] Division of Ser. No. 70,450, filed as PCT/JP92/01277, Oct. 2, 1992, Pat. No. 5,586,199.

[30] Foreign Application Priority Data

Oct. 2, 1991 [JP] Japan ................................. 3-255353
Apr. 13, 1992 [JP] Japan ................................. 4-092996

[51] Int. Cl.$^6$ ........................................... G06K 9/46
[52] U.S. Cl. ........................... 382/197; 382/203; 382/205
[58] Field of Search ................................. 382/197, 199, 382/201, 202, 203, 205

[56] References Cited

U.S. PATENT DOCUMENTS 5,586,199  12/1996  Kanda et al. ........................... 382/197

*Primary Examiner*—Andrew Johns
*Attorney, Agent, or Firm*—Staas & Halsey

[57] ABSTRACT

The present invention relates to a method for determining an orientation of a line segment in a contour in a local area of a binary contour image. The number of pixels having a predetermined value and located in each orientation in the local area, is obtained, and it is determined that a line segment exists in an orientation in which the number of pixels is large. Further, when it is determined that the number of pixels located in each of a plurality of orientations and having a predetermined value is greater than a sum of the numbers of pixels in orientations adjacent to said each orientation on both sides thereof, it is determined that a line segment exists in said each orientation. Two orientations in which large numbers of pixels are located are detected, and it is determined whether the point is a constituent of a line segment, a line segment of the sub-straight-line form, or a near-corner point, depending on angles made by the two orientations is equal to 180°, or a difference of the angles made by the two orientations from 180°. Contiguously arrayed pixels in the same orientation are detected as a line segment. A position and an orientation are obtained from points near a corner, and representative values of the positions and orientations of contiguously arrayed near-corner points are determined.

41 Claims, 26 Drawing Sheets

Fig. 9B  LINE SEGMENT ORIENTATION θ
NUMBER OF PIXELS

| | 0 | 1 | 2 | 3 | 4 | 5 | 6 | 7 |
|---|---|---|---|---|---|---|---|---|
| | 4 | | | | | | 4 | |

A: CENTER PIXEL

CENTER PIXEL

CENTER PIXEL

SINCE 15 PIXELS > 5+0 PIXELS, AREA IN ATTENTION IS DETERMINED TO BE LINE SEGMENT EXTRACTION AREA a = 15 PIXELS
b = 0 + 5
  = 5 PIXELS

SINCE a - b =10 >0, AREA IS DETERMINED TO BE LINE SEGMENT EXTRACTION AREA

NUMBER OF PIXELS IN MASK

Fig.25
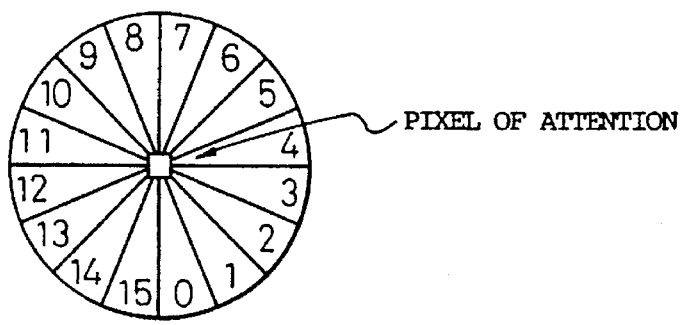
PIXEL OF ATTENTION
Fig.26A  Fig.26B
CENTER PIXEL G
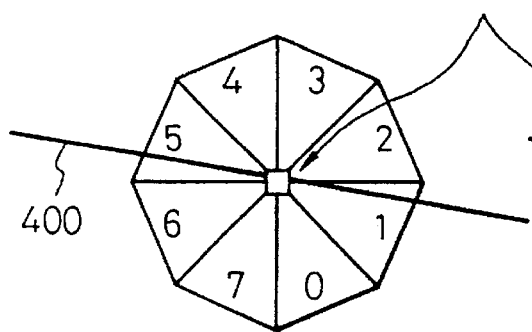 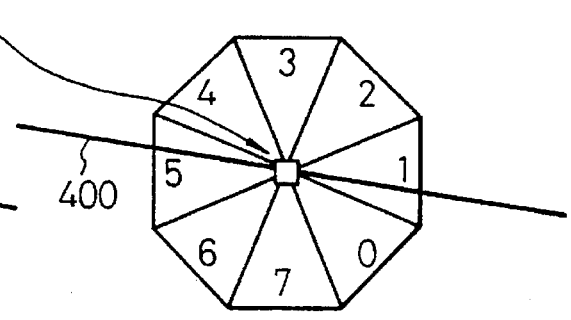
LINE SEGMENT CANDIDATE 1-5   LINE SEGMENT CANDIDATE 1-5
Fig.26C
DETECTED LINE SEGMENT ORIENTATION 3-11
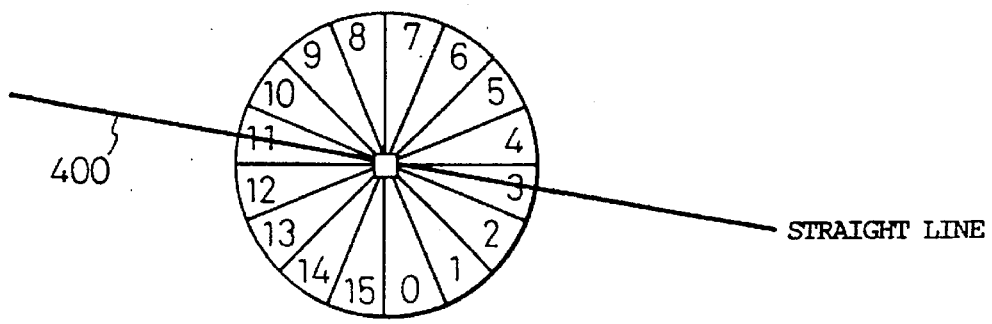
STRAIGHT LINE

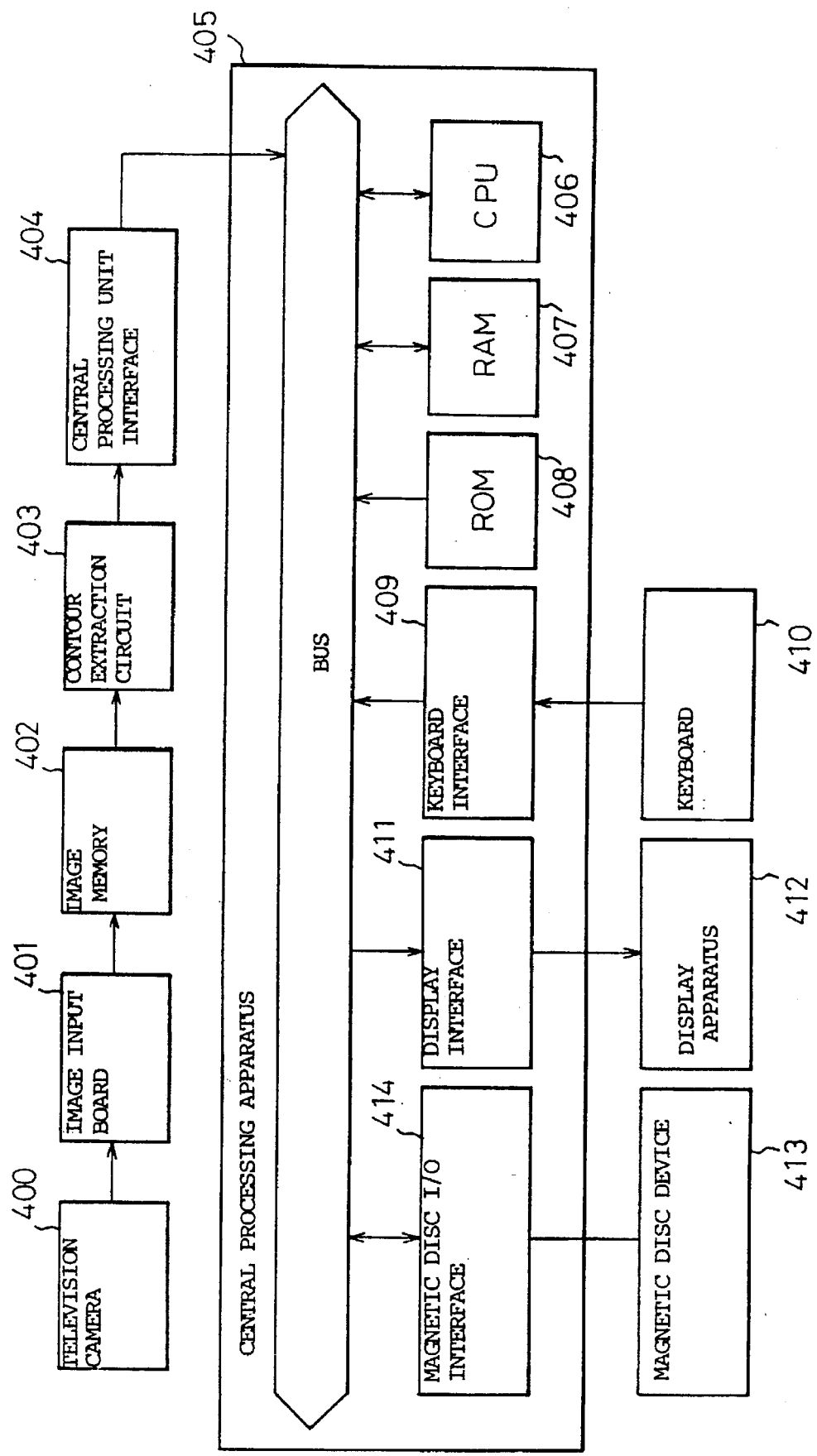

METHOD FOR DETERMINING ORIENTATION OF CONTOUR LINE SEGMENT IN LOCAL AREA AND FOR DETERMINING STRAIGHT LINE AND CORNER

This application is a division of application Ser. No. 08/070,450, filed as PCT/JP92/01277, Oct. 2, 1992, now U.S. Pat. No. 5,586,199.

TECHNICAL FIELD

The present invention relates to a method for determining an orientation of a line segment in a contour in a local area of a binary contour image.

In the fields of image measurement and image recognition, when obtaining information on portions which correspond to characteristic features of an object, from an image stored in an image memory, a contour of the image is extracted, and then information on a characteristic feature such as a straight line is extracted. For extracting such information, it is necessary to obtain an orientation of the line segment in each area of the image.

BACKGROUND ART

FIGS. 1 and 2 are diagrams illustrating the Hough transform, which is conventionally used for extracting information on a straight line, from information on an image. According to the Hough transform, when a set of coordinates of a pixel the value of which corresponds to black (or white) of an original image is denoted by (xi, yi), curves expressed by the equations $$\rho = xi \sin \theta + yi \cos \theta,$$

are drawn on a ρ-θ plane (FIG. 2) for all of the pixels the values of which correspond to black (or white). Since points on the same straight line on the original image (x-y plane) correspond to the same set of coordinates ρ, θ as indicated in FIG. 1, the above curves cross at a crossing point (ρ, θ) on the ρ-θ plane (FIG. 2). Therefore, the straight line on the original image (x-y plane) can be obtained from the above crossing point of the curves on the ρ-θ plane.

However, it is necessary to draw the curves as above for all of the points on each straight line, to obtain a straight line in accordance with the above method, and processing to obtain a crossing point is necessary for each straight line. Therefore, the amount of data processing becomes great. This great amount of data processing takes a large amount of software processing time, and large size hardware for the hardware processing.

Further, there is a drawback that only straight lines can be detected by the Hough transform, and it is impossible to detect a curve which can be locally deemed to be a line segment, but macroscopically has a curvature.

SUMMARY OF THE INVENTION

A first object of the present invention is to provide a method for determining an orientation of a line segment in a contour in a local area of a binary contour image whereby a local line segment in an image can be detected through a simple process.

A second object of the present invention is to provide a method and an apparatus for determining an orientation of a line segment in a contour in a local area of a binary contour image whereby a local line segment in an image can be detected through a simple process while suppressing an influence by noise.

A third object of the present invention is to provide a method and an apparatus for determining a macroscopic line segment from local line segments passing through respective contour points of an image.

A fourth object of the present invention is to provide a method and an apparatus for determining a connecting portion which connects between macroscopic line segments of contour points of an image.

A fifth object of the present invention is to provide a method and an apparatus for determining a position and an orientation of a corner formed in a contour of an image, based on orientations of line segments viewed from each of contour points of an image.

A sixth object of the present invention is to provide a method and an apparatus for determining a polygon formed in a contour of an image, based on positions and orientations of macroscopic line segments and corners formed in a contour of an image, which are obtained from the contour.

According to the first aspect of the present invention, there is provided a method for determining an orientation of a local line segment in a contour in a local area of a binary contour image. The method contains: a first step for obtaining the numbers of pixels each having a predetermined value and located in a plurality of orientations from one of pixel(s) located in the local area and having the above predetermined value; and a second step for determining that a local line segment exists in a certain orientation when the number of pixels located in the orientation is greater than a predetermined value.

According to the second aspect of the present invention, there is provided a method for determining an orientation of a local line segment included in a contour in a binary contour image. The method contains: a first step for obtaining the numbers of pixels each having a predetermined value and located in a plurality of orientations from each of a plurality of pixels respectively located at the centers of a plurality of local areas and each having the above predetermined value; and a second step for determining in each of the plurality of local areas that a local line segment exists in a certain orientation when the number of pixels located in the orientation is greater than a predetermined value.

According to the third aspect of the present invention, there is provided a method for determining an orientation of a local line segment in a contour in a local area of a binary contour image. The method contains: a first step for obtaining the numbers of pixels located in a plurality of orientations from one of pixel(s) located in the local area and having a predetermined value; a second step for obtaining a difference between the number of pixels located in each orientation and a sum of the numbers of pixels in orientations adjacent to each orientation on both sides thereof; and a third step for determining that a local line segment exists in each orientation when the difference for each orientation is greater than a predetermined value.

According to the fourth aspect of the present invention, there is provided a method for determining an orientation of a local line segment included in a contour in a binary contour image. The method contains: a first step for obtaining the numbers of pixels each having a predetermined value and located in a plurality of orientations from each of a plurality of pixels respectively located at the centers of a plurality of local areas and each having the above predetermined value; a second step for obtaining in each of the plurality of local areas a difference between the number of pixels located in each orientation and a sum of the numbers of pixels in orientations adjacent to each orientation on both sides thereof; and a third step for determining that a local lime segment exists in each orientation when the difference for each orientation is greater than a predetermined value.

According to the fifth aspect of the present invention, there is provided a method for detecting a line segment from a contour in a binary contour image. The method contains: a first step for counting the numbers of pixels each having a predetermined value and located in each of a plurality of sectorial areas each of which is arranged in a predetermined range of azimuth at each of a plurality of pixels respectively located at the centers of a plurality of local areas and each having the above predetermined value; a second step for determining in each of the plurality of local areas that a local line segment exists in an orientation corresponding to one of the sectorial areas when the number of pixels located in the sectorial area is greater than a predetermined value; a third step for determining in each of the plurality of local areas that a local line segment of a straight-line form passing through the pixel exists in the local area when two local line segments are determined to exist in the second step, and the orientations of the two local line segments differ by 180° from each other; and a fourth step for determining a group of pixels as a candidate of a line segment when the pixels in the group are contiguously arrayed and it is determined that local line segments in the same orientation pass through the respective pixels in the respective local areas.

According to the sixth aspect of the present invention, in addition to the steps in the method of the fifth aspect of the present invention, the following steps are added. In the first additional step: first and second local line segments which are determined in the above second step, are detected as constituents of a local line segment of a sub-straight-line form when the orientation of the second local line segment differs from the orientation of the first local line segment by an angle not equal to 180° and within a predetermined range of azimuth from the orientation of the first local line segment. In the second step: when a first series of pixels constituted by pixels arrayed contiguously and a second series of pixels constituted by pixels arrayed contiguously are connected by a third series of pixels constituted by pixels arrayed contiguously, and the following conditions are satisfied, the third series of pixels are detected as a connection portion which connects between the line segments respectively constituted by the first and second series of pixels. The above conditions are: a plurality of first local line segments in a first orientation pass through the pixels constituting the first series of pixels, respectively; a plurality of second local line segments in a second orientation pass through the pixels constituting the second series of pixels, respectively; a line segment of the sub-straight line form is detected at each of the pixels constituting the third series of pixels; an orientation of one of the first and second local line segments constituting the line segment of the sub-straight line form at a first pixel in the third series of pixels adjacent to the first series of pixels is equal to the above first orientation; an orientation of one of the first and second local line segments constituting the line segment of the sub-straight line form at a second pixel in the third series of pixels adjacent to the second series of pixels is equal to the above second orientation; and the third series of pixels does not contain a candidate of a line segment.

According to the seventh aspect of the present invention, there is provided a method for detecting a line segment from a contour in a binary contour image. The method contains: a first step for counting the numbers of pixels each having a predetermined value and located in each of a plurality of sectorial areas each of which arranged in a predetermined range of azimuth at each of a plurality of pixels respectively located at the centers of a plurality of local areas and each having the above predetermined value; a second step for determining in each of the plurality of local areas that a local line segment exists in an orientation corresponding to one of the sectorial areas when the number of pixels located in the sectorial area is greater than a predetermined-value; a third step for determining in each of the plurality of local areas that a local line segment of a straight-line form passing through the pixel exists in the local area when two local line segments are determined to exist in the second step, and the orientations of the two local line segments differ by 180° from each other; and a fourth step for determining first and second local line segments as constituents of a local line segment of a sub-straight-line form corresponding to the local line segment of a straight-line form obtained in the second step when the first local line segment is one of the two local line segments determined in the second step, the orientation of the first local line segment is within a predetermined range of azimuth from the orientation of one of the two local line segments constituting the local line segment of the straight-line form determined in the second step, the second local line segment is the other of the above two local line segments determined in the second step, the orientation of the second local line segment is within a predetermined range of azimuth from the orientation of the other of the above two local line segments constituting the local line segment of the straight-line form determined in the second step, and the difference between the orientations of the above first and second local line segments is not equal to 180°; and a fifth step for determining a series of pixels as constituents of a candidate of a line segment when the pixels in the series are contiguously arrayed, at least one of the pixels in the series is the pixel through which the local line segment of the straight-line form is determined to pass in the second step, at least one line segment of the same orientation is determined at at least one of the pixels in the series, and a local line segment of the sub-straight-line form is determined at a pixel(s) other than the above at least one pixel in the series in the third step.

According to the eighth aspect of the present invention, in addition to the steps in the method of the seventh aspect of the present invention, the following step is added. In the additional step: when a first series of pixels constitutes a first candidate which is determined as a candidate of a line segment in the fifth step, the orientation of the local line segment of the straight-line form which is determined at the above at least one pixel is equal to a first orientation, a second series of pixels constitutes a second candidate which is determined as a candidate of a line segment in the fifth step, the orientation of the local line segment of the straight-line form which is determined at the above at least one pixel is equal to a second orientation, and the first and second series of pixels share at least one pixel; it is determined that the first candidate is a first line segment extending to one of the at least one pixel in the first series of pixels located nearest the above pixel shared by the first and second series of pixels, the second candidate is a second line segment extending to one of the at least one pixel in the second series of pixels located nearest the above pixel shared by the first and second series of pixels, and the first and second line segments are connected by a connection portion constituted by pixels contiguously arrayed between the first and second pixels.

According to the ninth aspect of the present invention, there is provided a method for detecting a position of a corner from a contour in a binary contour image. The method contains: a first step for counting the numbers of pixels each having a predetermined value and located in each of a plurality of sectorial areas each of which arranged in a predetermined range of azimuth at each of a plurality of pixels respectively located at the centers of a plurality of local areas and each having the above predetermined value; a second step for determining in each of the plurality of local areas that a local line segment exists in an orientation corresponding to one of the sectorial areas when the number of pixels located in the sectorial area is greater than a predetermined value; a third step for determining in each of the plurality of local areas that the pixel located at the center of the local area as a near-corner point when a difference between 180° and a difference between the orientations of the two local line segments determined in the second step exceeds a predetermined angle value; a fourth step for obtaining a group of pixels which are determined as the near-corner point, and are arrayed contiguously; a fifth step for obtaining for each group representative values of the coordinates of the respective pixels in the group; a sixth step for obtaining for each group a mean orientation of the orientations of the two local line segments in the local area containing at the center of the local area each pixel in the group; and a seventh step for obtaining a representative value of the orientations of all of the pixels in each group.

According to the tenth aspect of the present invention, there is provided a method for detecting a line segment from a contour in a binary contour image. The method contains: a first step for obtaining the numbers of pixels each having a predetermined value and located in a plurality of orientations from each of a plurality of pixels respectively located at the centers of a plurality of local areas and each having the above predetermined value; a second step for determining in each of the plurality of local areas that a local line segment exists in a certain orientation when the number of pixels located in the orientation is greater than a predetermined value; a third step for determining in each of the plurality of local areas that a local line segment passing through the pixel exists in the local area when the orientations of the two local line segments differ from each other by 180°, and the orientations of the two local line segments differ by 180° from each other; a fourth step for determining a group of pixels as a candidate of a line segment when the pixels in the group are contiguously arrayed and it is determined that local line segments in the same orientation pass through the respective pixels in the respective local areas; a fifth step for determining in each of the plurality of local areas that the pixel located at the center of the local area as a near-corner point when a difference between 180° and a difference between the orientations of the two local line segments determined in the second step exceeds a predetermined angle value; a sixth step for obtaining a group of pixels which are determined as the near-corner point, and are arrayed contiguously; a sixth step for obtaining for each group representative values of the coordinates of the respective pixels in the group; a seventh step for obtaining for each group a mean orientation of the orientations of the two local line segments in the local area containing at the center of the local area each pixel in the group; an eighth step for obtaining a representative value of the orientations of all of the pixels in each group; a ninth step for obtaining pairs of the representative values of the orientations of the corners, from among the representative values of the orientations of the corners obtained in the eighth step; a tenth step for obtaining line segments connecting points corresponding to the representative values of coordinates of the corners in the-respective pairs; an eleventh step for obtaining two pairs of corners in which the line segments connecting the points corresponding to the representative values of coordinates of the corners intersect; and a twelfth step for obtaining a tetragon by searching for candidates of line segments connecting four corners in the above two pairs, from among the candidates of line segments obtained in the fourth step.

BRIEF DESCRIPTION OF DRAWINGS

FIG. 25 is a diagram illustrating sixteen local orientations of line segments, which can be detected by using the patterns of FIGS. 12 and 13;

FIGS. 26A and 26B are diagrams illustrating an example of application of the patterns of FIGS. 12 and 13 to the contour point through which a line segment passes through;

FIG. 26C is a diagram indicating that a local orientation of a line segment detected by using the two patterns as indicated in FIGS. 26A and 26B, is detected as one of the sixteen orientations;

FIG. 36 is a block diagram illustrating a hardware construction for executing the various methods according to the present invention.

DESCRIPTION OF THE PREFERRED EMBODIMENTS

Figure 1:
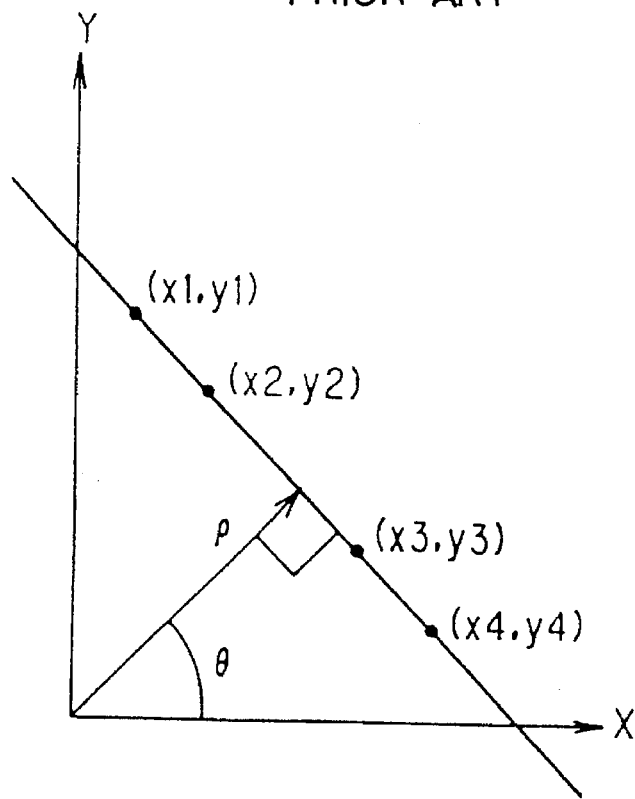
FIGS. 1 and 2 are explanatory diagrams of the Hough transform.
Figure 2:
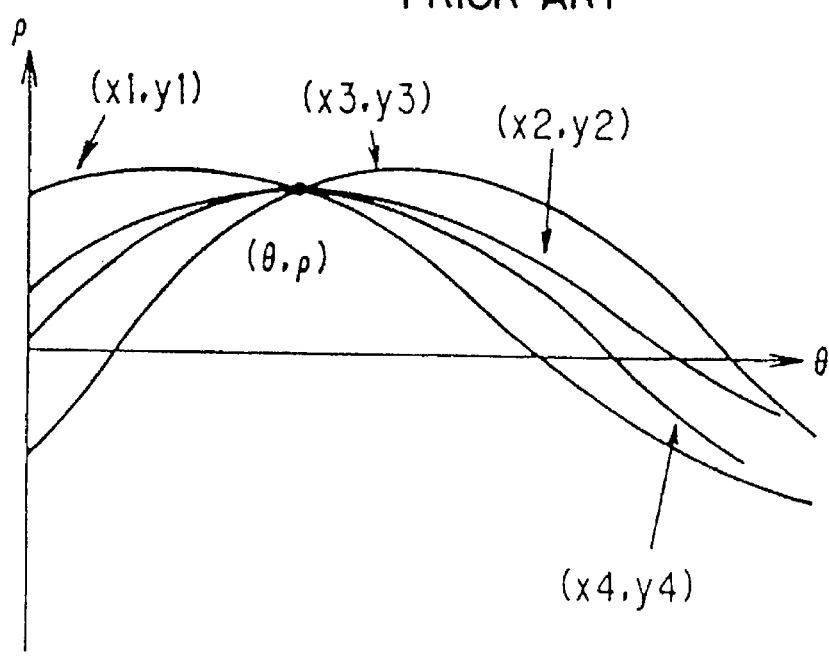
Figure 3:
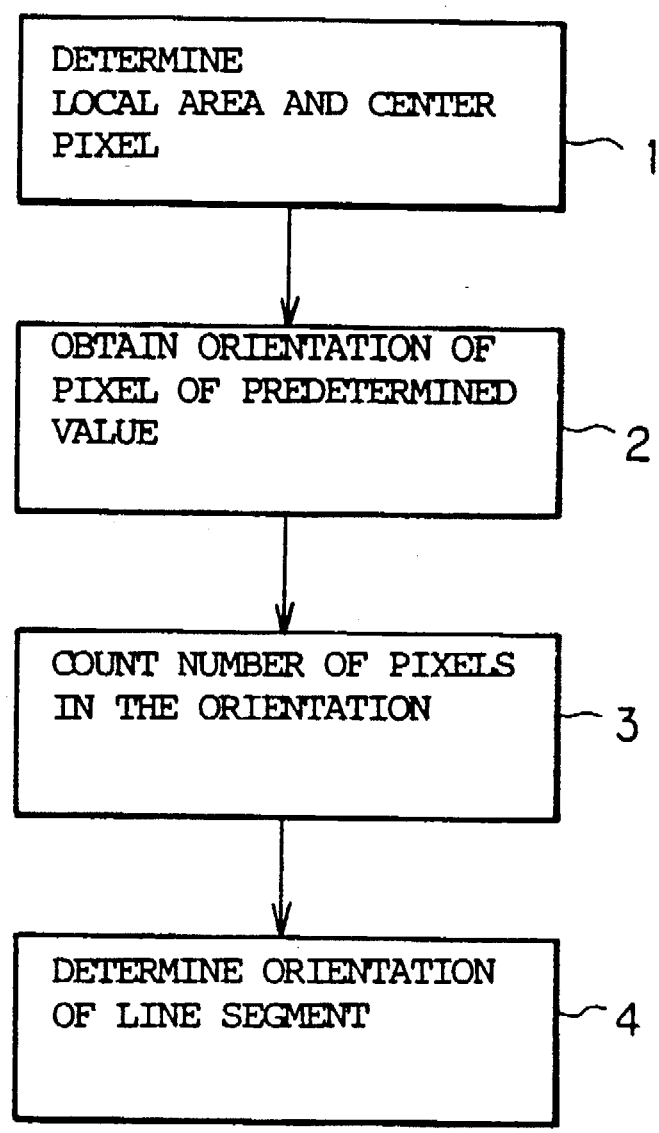
FIG. 3 is a diagram illustrating the basic construction of the first aspect of the present invention.

Basic Constructions of First and Second Aspects of Present Invention (FIG. 3)

FIG. 3 is a diagram illustrating the basic construction of the first aspect of the present invention. As indicated in FIG. 3, in step 1, a local area in which an orientation of a line segment is to be obtained, and a center pixel of the local area, are determined in a binary contour image in which orientations of line segments are required to be determine where the above center pixel is one of the contour points.

In step 2, orientations from the above center pixel to pixels other than the center pixel in the local area, are obtained.

In step 3, the number of pixels having the above predetermined value and located in each orientation in the above local area, is counted.

Then, in step 4, it is recognized that a line segment extends in an orientation in which the number of pixels having the predetermined value in the above local area is large.

Although not shown, according to second aspect of the present invention, the processing of FIG. 3 is performed in all of the local areas having as center pixels thereof all of the pixels having the above predetermined value in the above binary contour image, respectively. Thus, a distribution of line segments in all of the areas of the above contour image is recognized. Further, contour lines (curves and straight lines) in all of the areas of the above contour image is recognized by synthetically analyzing these line segments.

The above plurality of pixels which are assumed to be a center pixel in the above second aspect of the present invention, can be all of the pixels having the predetermined value in the binary contour image.

The plurality of orientations in the above first and second aspects of the present invention can be obtained by determining an angle made between a straight line passing through each of the pixels having the above predetermined value in each of the above local area and the center pixel in the local area, and a straight line in a predetermined orientation passing through the center pixel.

In the above first and second aspects of the present invention, the above counting operation of the number of pixels having the predetermined value and located in each of the plurality of orientations, can be performed by counting the number of pixels located in each section of a pattern containing a plurality of sectorial areas each of which is arranged in a predetermined range of azimuth from the center pixel.

In the above first and second aspects of the present invention, the above counting operation of the number of pixels having the predetermined value and located in each of the plurality of orientations, can be performed by counting the number of pixels located in each section of a second pattern containing a plurality of sectorial areas each of which is arranged in the predetermined range of azimuth from the center pixel, and the locations of the sectorial areas in the second pattern is shifted from the locations of the sectorial areas in the above pattern by half of the predetermined range of azimuth.

In the above first and second aspects of the present invention, it may be determined that line segments exist in orientations in which the above numbers of pixels are the largest and the second largest, respectively.

In the above first and second aspects of the present invention, the above determination of orientations may be waived for a center pixel when no other pixel having the above predetermined value is contiguous to the center pixel, since the center pixel is considered to be isolated from the other pixel having the above predetermined value.

In the above first and second aspects of the present invention, the above determination of orientations may be waived when all of the pixels contiguous to the center pixel have the same value as the center pixel since the center pixel is considered not to be a constituent of a line segment.

Embodiments of First and Second Aspects of Present Invention (FIGS. 4 to 12)

Figure 4:
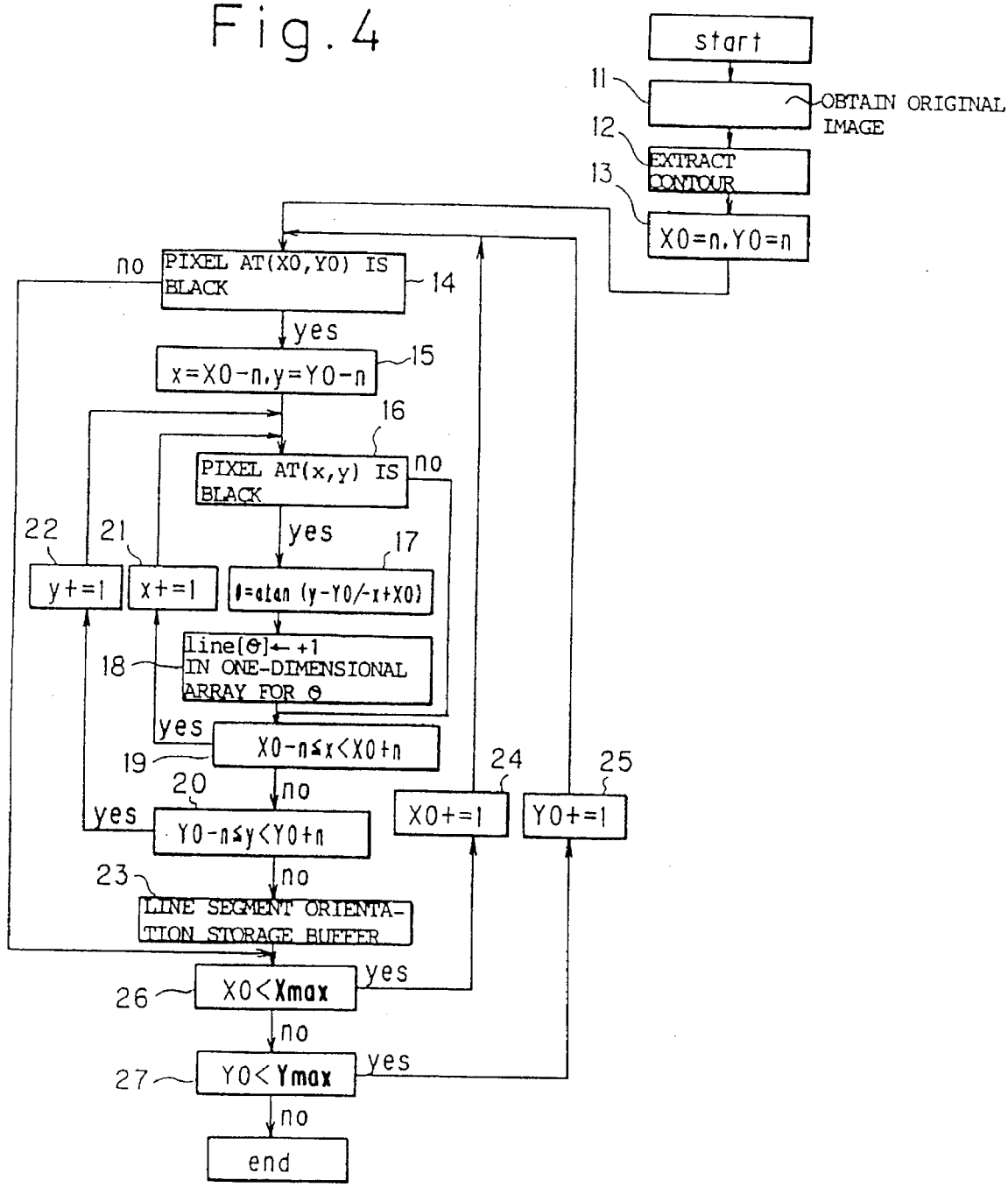
FIG. 4 is a diagram indicating an algorithm for detecting a line segment in a local area in the embodiment of the second aspect of the present invention.

FIG. 4 is a diagram indicating an algorithm for detecting a line segment in a local area in the embodiment of the second aspect of the present invention.

Figure 5:
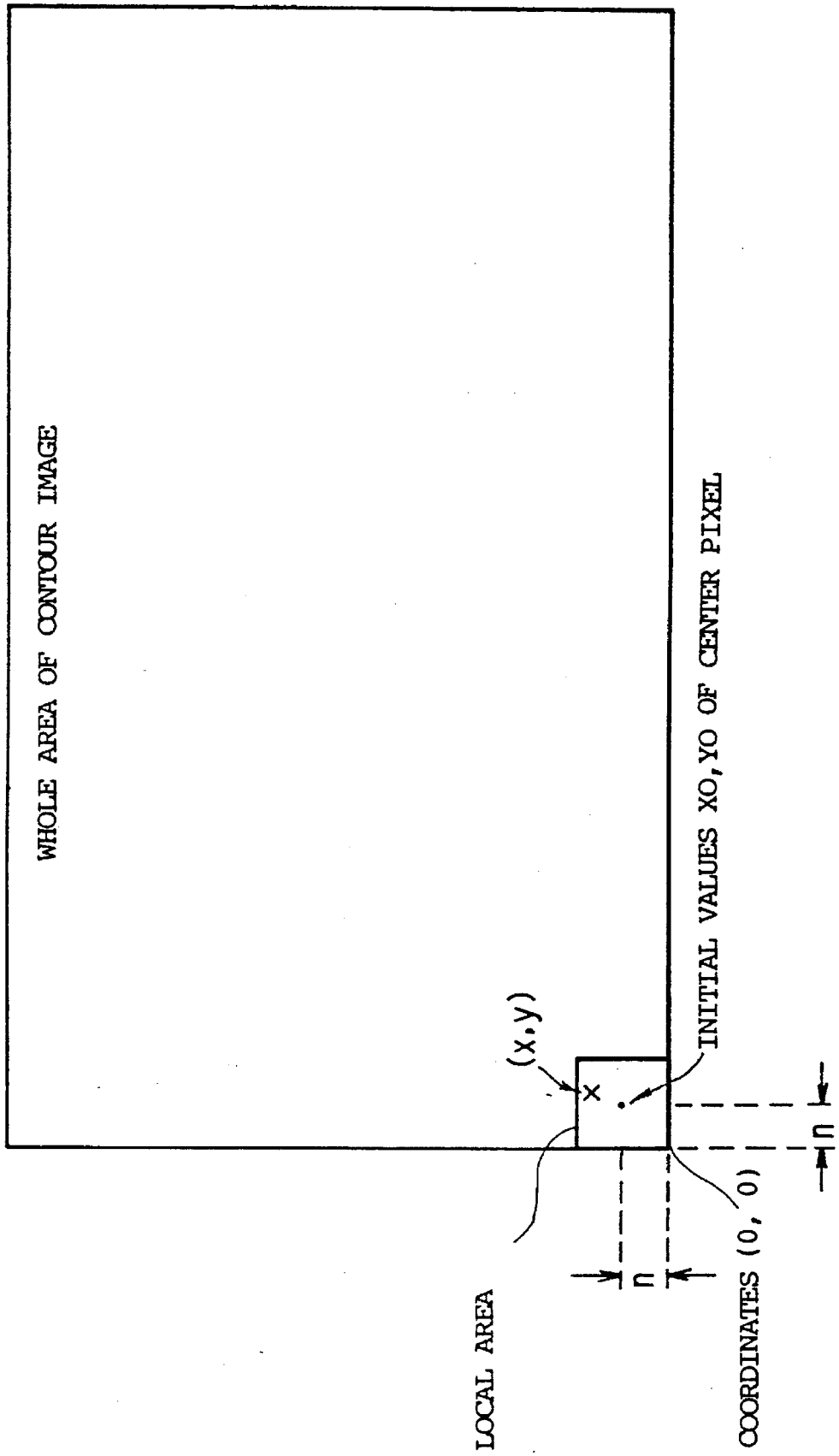
FIG. 5 is a diagram illustrating a local area in a whole area of a contour image.

In FIG. 4, in step 11, an original image is obtained. Then, in step 12, a contour line is extracted from the above original image. In step 13, as indicated in FIG. 5, when it is assumed that a set of coordinates of a corner of the contour image in an image memory is (0, 0), and a start point (having the coordinates (X0, Y0)) of the center pixels in local areas is a pixel located at an nth pixel in each of the X- and Y-directions from the coordinates (0, 0). Further, in this embodiment, the sizes of the local areas are assumed to be (2n+1)×(2n+1) as indicated in FIG. 5.

In step 14, it is determined whether or not the center pixel at the coordinates (X0, Y0) is black (when the above contour image indicates contour points by black). When it is determined that the center pixel is not black, the operation goes to step 26. When it is determined that the center pixel is black, the operation goes to step 15.

In step 15, initial values of coordinates (x, y) of objective pixels in the local area to which orientations from the center pixel are to be obtained, are made the least values of the X- and Y-coordinates, respectively. Then, in step 16, it is determined whether or not the objective pixel of the coordinates (x, y) is black (when the above contour image indicates contour points by black). When it is determined that the objective pixel is not black, the operation goes to step 19. When it is determined that the objective pixel is black, the operation goes to step 17.

Figure 6:
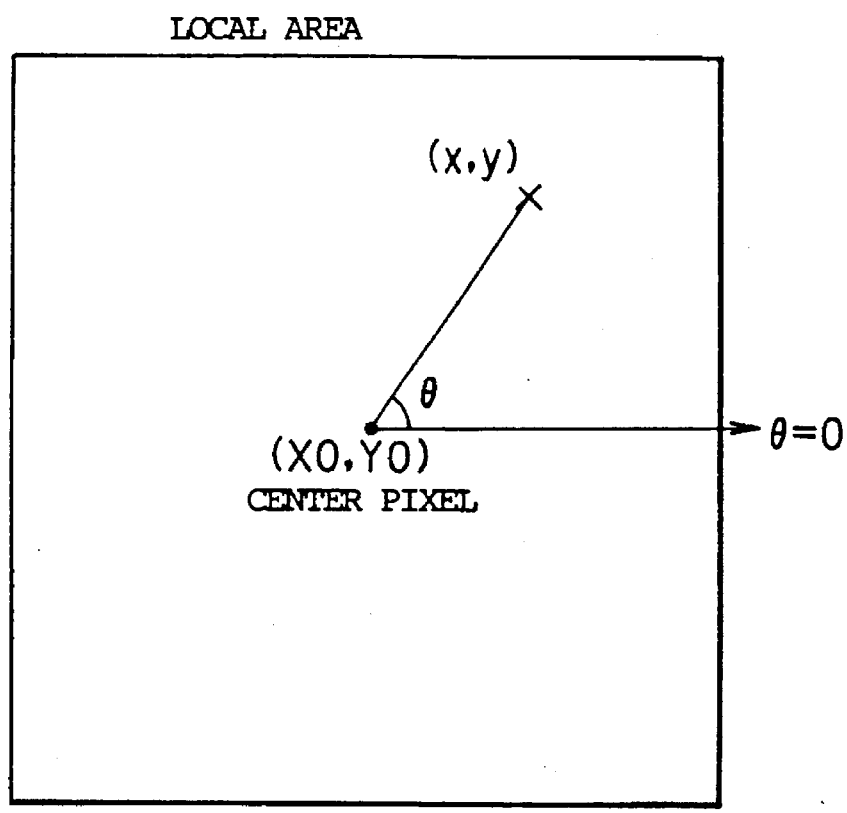
FIG. 6 is a diagram illustrating an orientation of an object pixel at the center pixel of a local area.
Figure 7:
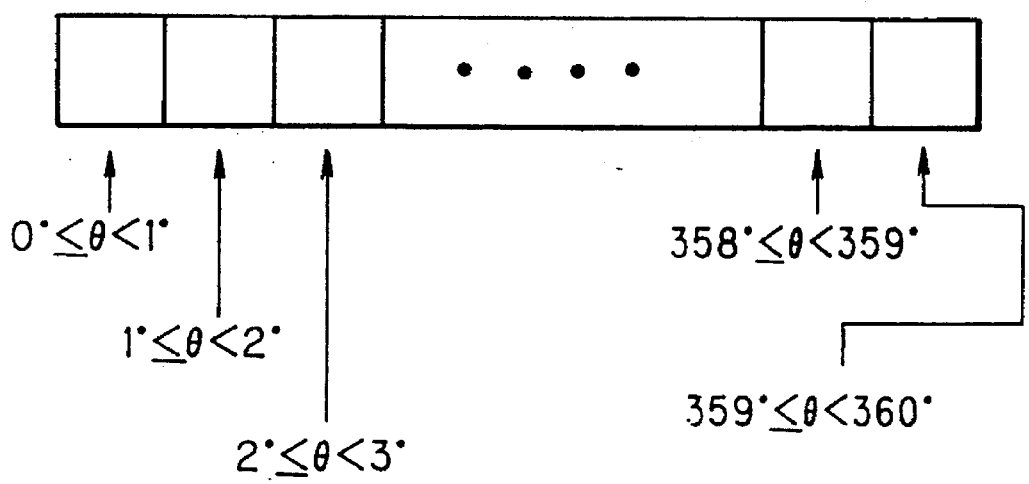
FIG. 7 is a diagram illustrating a series of numbers of pixels for use in obtaining an orientation of a line segment.

In step 17, as indicated in FIG. 6, an angle θ from the orientation of the x-axis, indicating an orientation in which the objective pixel of the coordinates (x, y) is located from the center pixel (X0, Y0) of the local area, is obtained. Then, in step 18, data (denoted by line [θ]) in one, corresponding to the angle θ obtained as above, of a series of registers (or a series of memory areas) provided corresponding to the 360 orientations generated by dividing 360° by a unit range of 1°, is incremented by one. In this embodiment, it is assumed that an image processing apparatus performing the method according to the present invention, comprises a series of registers corresponding to the 360 orientations generated by dividing 360° by a unit range of 1°, as indicated in FIG. 7, for obtaining a distribution of the above angle θ.

Next, in step 19, it is determined whether or not the X-coordinate of the above objective pixel has reached the maximum value of the X-coordinates of the local area. When it is determined that the X-coordinate of the objective pixel has reached the maximum value, the operation goes to step 20. When it is determined that the X-coordinate has not reached the maximum value, the operation goes to step 21 so as not to increment the X-coordinate, and the operation goes back to step 16.

In step 20, it is determined whether or not the Y-coordinate of the above objective pixel has reached the maximum value of the Y-coordinates in the local area. When it is determined that the Y-coordinate of the above objective pixel has reached the maximum value of the Y-coordinates in the local area, the operation goes to step 23. When it is determined that the Y-coordinate of the above objective pixel has not reached the maximum value of the Y-coordinates is in the local area, the operation goes to step 22 to increment the Y-coordinate by one, and the operation goes back to step 16.

In step 26, it is determined whether or not the X-coordinate X0 of the center pixel has reached the maximum value, Xmax of the X-coordinate in the contour image memory. When it is determined that the X-coordinate X0 of the center pixel has reached the maximum value Xmax of the X-coordinate in the contour image memory, the operation goes to step 27. When it is determined that the X-coordinate X0 the center pixel has not reached the maximum value Xmax of the X-coordinate in the contour image memory, the operation goes to step 24 to increment the X-coordinate X0 by one, and the operation goes back to step 14.

In step 27, it is determined whether or not the Y-coordinate Y0 of the center pixel has reached the maximum value Ymax of the Y-coordinate in the contour image memory. When it is determined that the Y-coordinate Y0 of the center pixel has reached the maximum value Ymax of the Y-coordinate in the contour image memory) the operation of FIG. 4 is completed. When it is determined that the Y-coordinate Y0 of the center pixel has not reached the maximum value Ymax the Y-coordinate in the contour image memory, the operation goes to step 25 to increment the Y-coordinate Y0 by one, and the operation goes back to step 14.

Conventionally, there is an image processing apparatus which has a function of storing coordinates of contour points (pixels of black) only in a contour point buffer.

Figure 8:
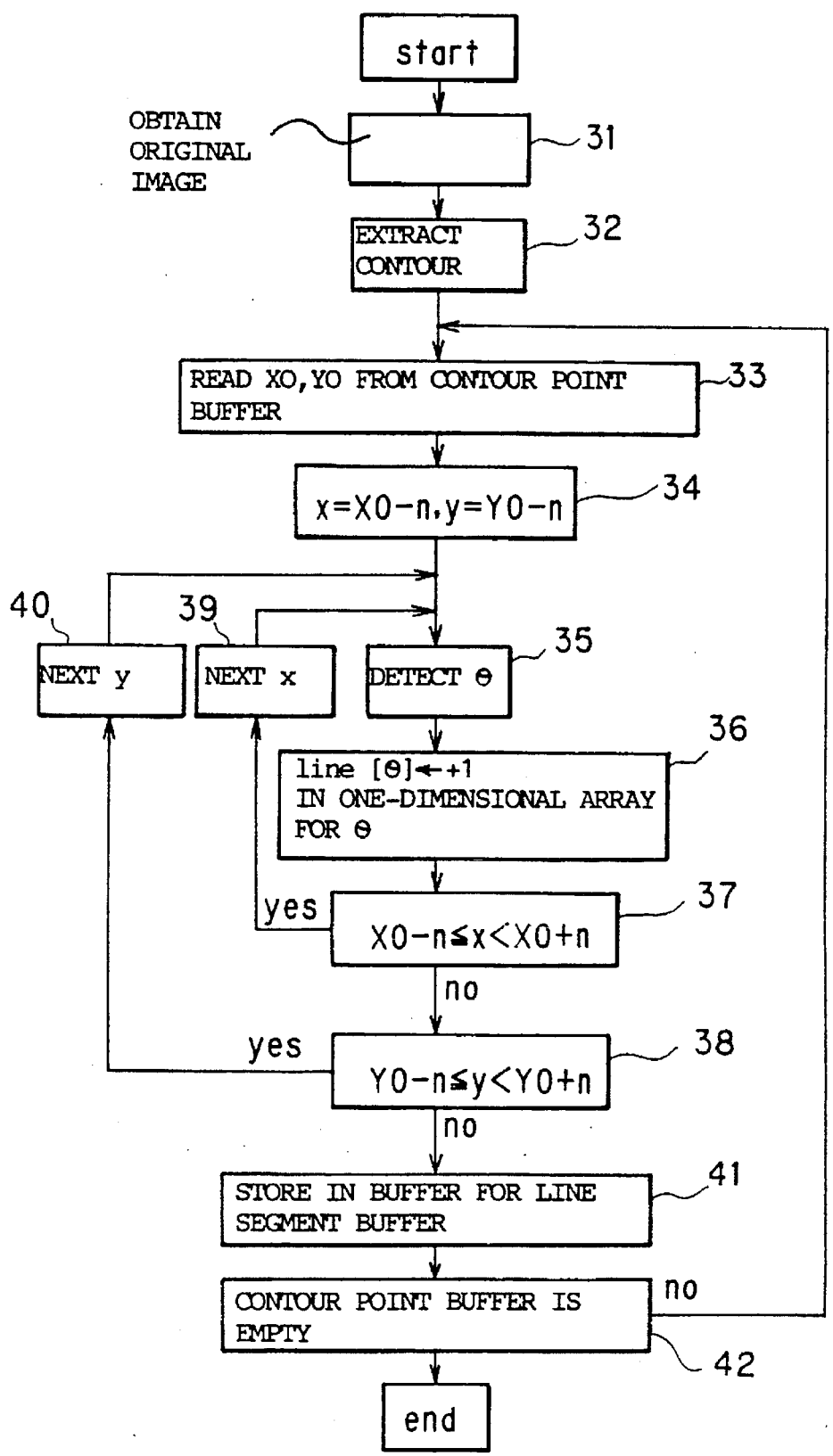
FIG. 8 is a diagram indicating a second example of an algorithm for detecting a line segment in a local area in the embodiment of the second aspect of the present invention.

In this case, the processing in the steps 14 and 16 in FIG. 4, i.e., the processing of determining whether or not the pixel is a contour point, is not necessary, and the determination of the orientations of line segments can be performed by reading the coordinate values stored in the contour point buffer in the large-to-small order to detect the angle θ. FIG. 8 is a diagram indicating a second example of an algorithm for detecting a line segment in a local area in this case.

Figure 9A:
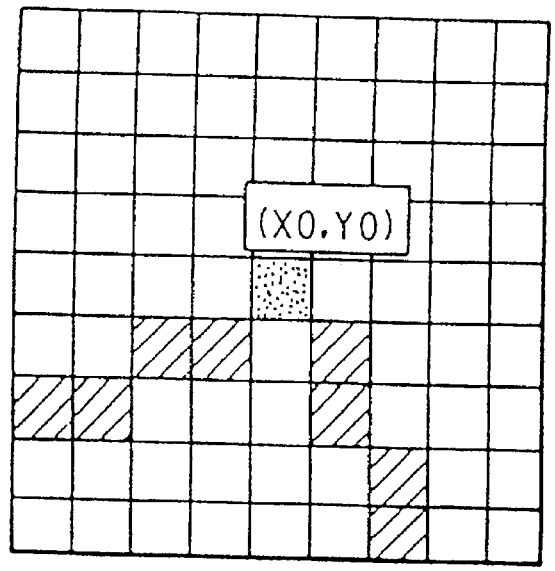
FIG. 9 is a diagram illustrating an example of a distribution of contour points in a local area, and a series of numbers of pixels corresponding to the distribution.

FIG. 9 is a diagram illustrating an example of a local area, and a series of the numbers of pixels corresponding to the line segment orientation obtained from the local area.

Figure 10:
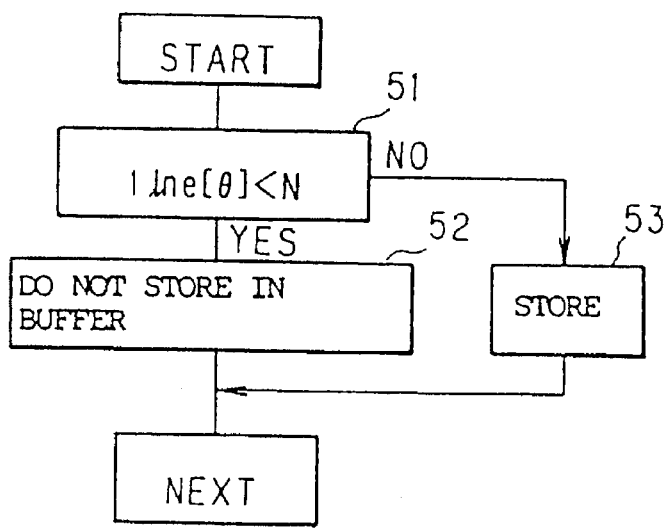
FIG. 10 is a diagram indicating an example of an algorithm for determining a line segment.
Figure 11:
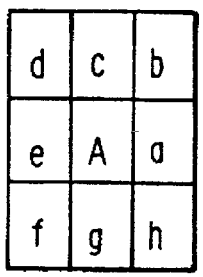
FIG. 11 is a diagram illustrating a configuration of the center pixel and the pixels surrounding the center pixel.

FIG. 10 is a diagram indicating an example of an algorithm for determining an orientation of a line segment in each local area, from the series (FIG. 7) of the numbers of pixels which is obtained in each local area in the whole area of the binary contour image according to the procedures of FIGS. 4 and 8. As indicated in FIG. 10, the data line[θ] corresponding to each angle θ is not stored in the line segment orientation buffer when the data line[74 ] is less than a predetermined threshold value N (step 52). The data line[θ] corresponding to each angle θ is stored in the line segment orientation buffer when the data line[θ] is not less than the predetermined threshold value N (step 53).

Further, as mentioned before, since a center pixel is considered to be isolated when none of pixels (a to h in FIG. 11) contiguous to the center pixel A (FIG. 11) is black, the above determination of orientation may not be performed in this case.

In addition, the above determination of orientation may be waived when all of the pixels contiguous to the center pixel A are black, since the center pixel is considered not to be a constituent of a line segment.

Figure 12:
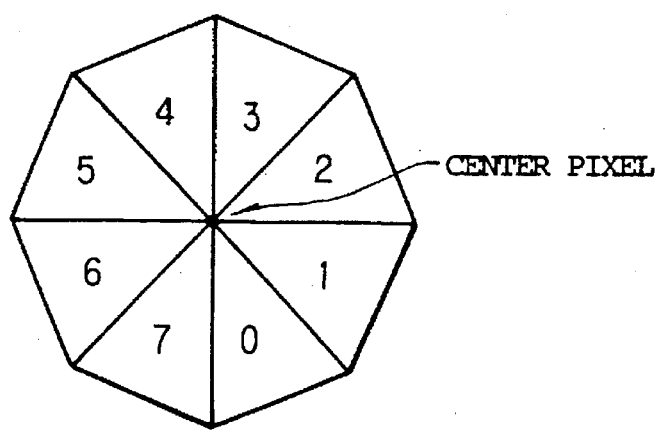
FIG. 12 is a diagram illustrating a pattern for use in detection of a line segment.

Although in the above embodiments, the orientation to the objective pixel viewed from the center pixel in each local area is obtained by calculation of the coordinates of the center pixel and the objective pixel (steps 17 in FIG. 4 and step 35 in FIG. 8), it is possible to obtain the series of the numbers of pixels (FIG. 7) indicating an orientation of a line segment by using a pattern having a plurality of sectorial areas as indicated in FIG. 12, and counting the numbers of contour points (black pixels) located in the respective areas 0 to 7 of the pattern.

Figure 13:
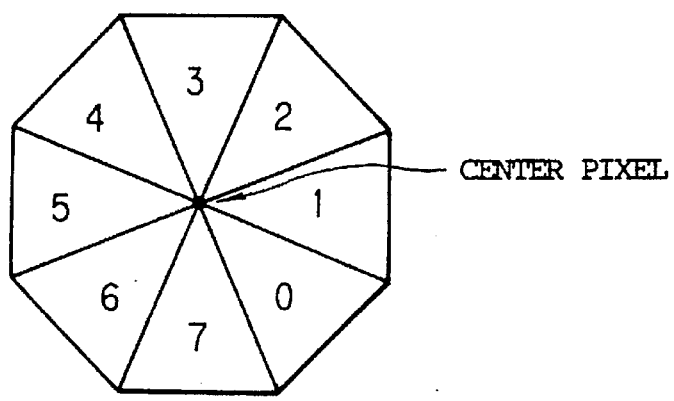
FIG. 13 is a diagram illustrating a second pattern for use in detection of a line segment.

Further, the second pattern as indicated in FIG. 13 may be used together with the pattern of FIG. 12 to interpolate the series of the numbers of pixels (FIG. 7) indicating the orientation of a line segment. The second pattern is generated by shifting the locations of the sectorial areas in FIG. 12 by a half pitch.

As explained above, by the method for determining an orientation of a line segment in a contour in a local area of a binary contour image according to the first and second aspects of the present invention, it is possible to detect a local line segment by simple processing.

Figure 14:
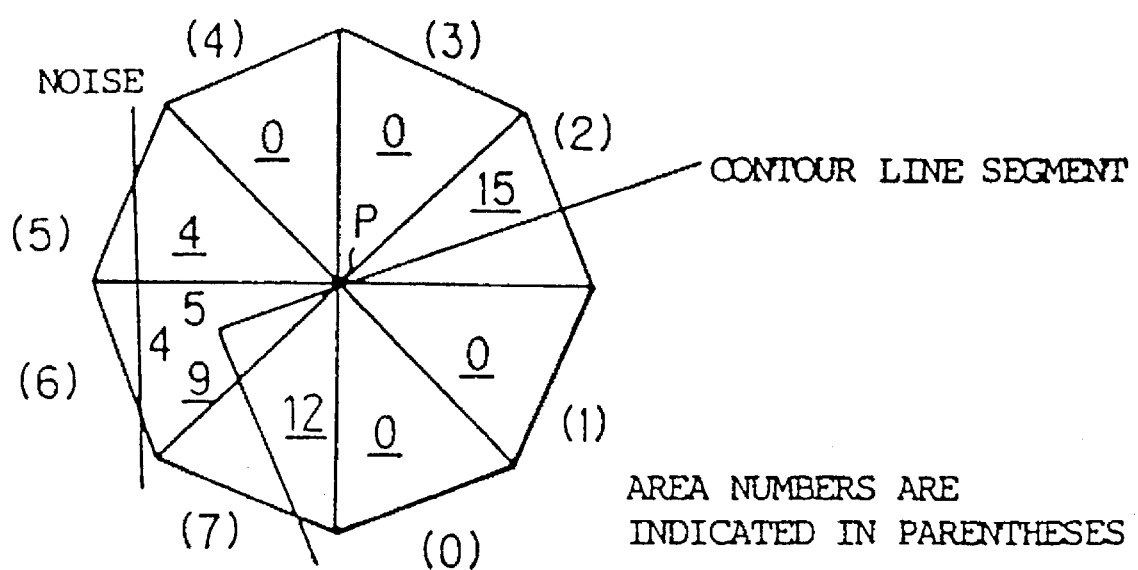
FIG. 14 is a diagram illustrating an example of the method for determining an orientation of a line segment according to the first aspect of the present invention.

Remaining Problems in First and Second Aspects of Present Invention (FIG. 14)

FIG. 14 is a diagram illustrating the result of an example operation of the first aspect of the present invention, wherein the numbers of pixels having the same value as a pixel P and located in eight orientations in the vicinity of the pixel P are obtained as the numbers of pixels respectively located in the eight sectorial areas (0) to (7) which are arranged around the pixel P. The numbers of pixels respectively located in the eight sectorial areas (0) to (7) are indicated by the underlined numbers. As indicated in FIG. 14, the number of pixels in the sectorial area through which a contour line passing through the pixel P passes, is large.

However, it is difficult to determine whether or not a contour line exists when noise and the like is included in data as indicated in FIG. 14. For example, although the count in the area (6) of FIG. 14 is equal to nine, only five out of the nine are contributions from the actual contour line, and the remaining four come from noise.

Figure 15:
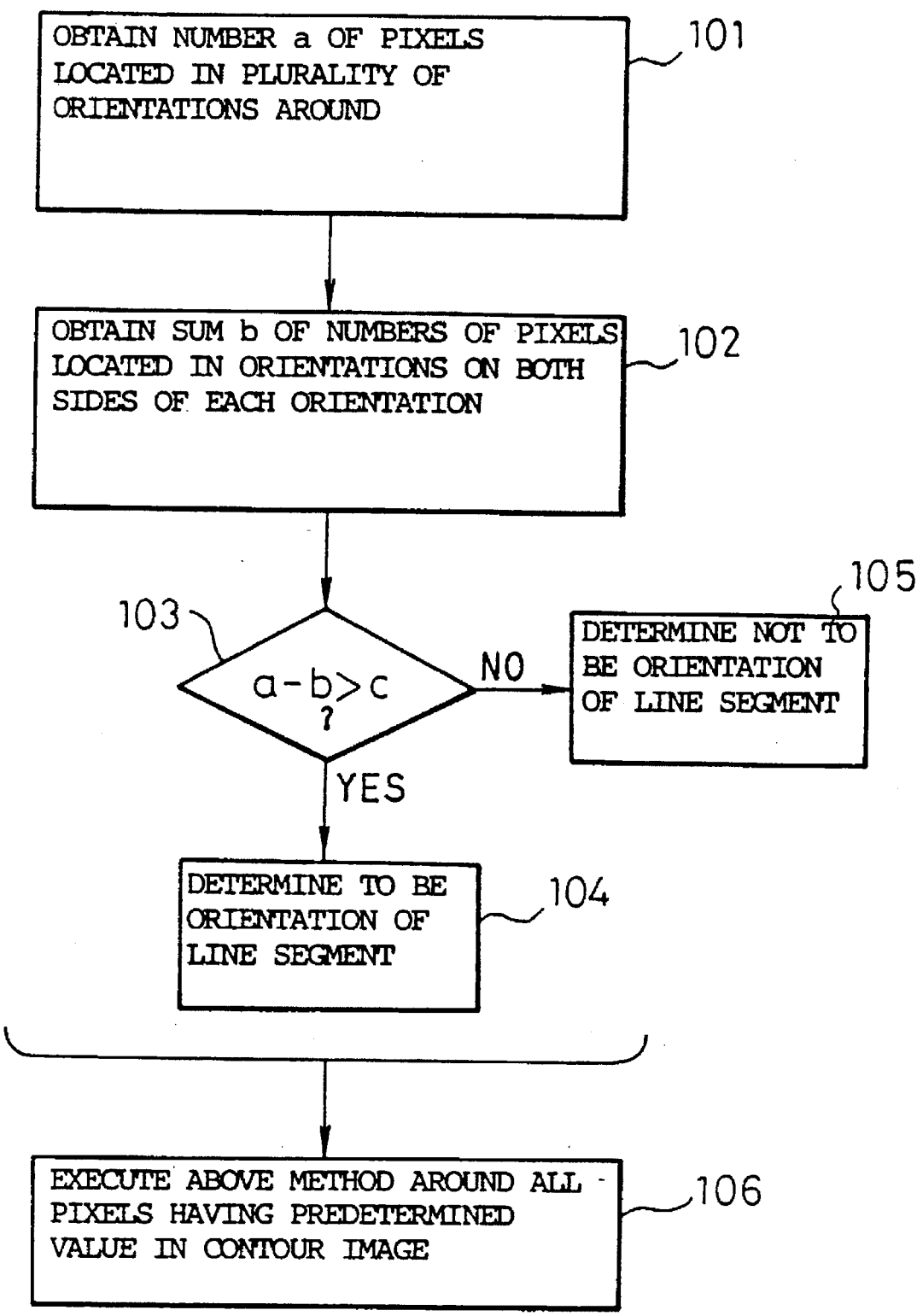
FIG. 15 is a diagram illustrating the basic construction of the third aspect of the present invention.
Figure 16:
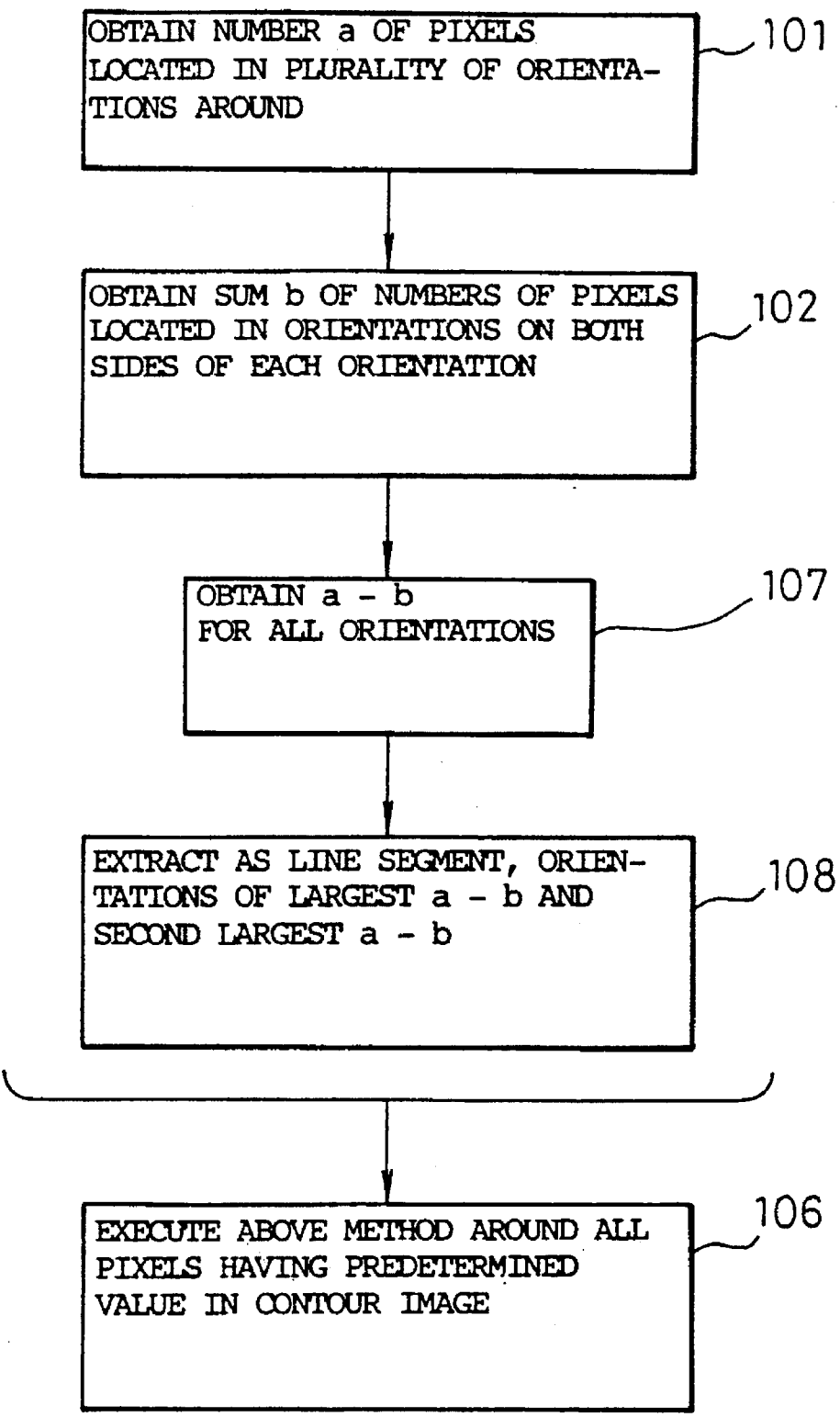
FIG. 16 is a diagram illustrating the basic construction of the fourth aspect of the present invention.

Basic Construction of According to Third and fourth Aspects of Present Invention (FIGS. 15 and 16)

As indicated in FIG. 15, in the method for determining an orientation of a local line segment in a contour in a local area of a binary contour image, according to the third aspect of the present invention:

the numbers of pixels located in a plurality of orientations from one of pixel(s) located in the local area and having a predetermined value is obtained (step 101);

a sum of the numbers of pixels in orientations adjacent to each orientation on both sides thereof, is obtained (step 102);

a difference between the number of pixels located in each orientation and the above sum, is obtained (step 103); and it is determined that a local line segment exists in each orientation when the difference for the each orientation is greater than a predetermined value (step 104).

As indicated in FIG. 16, in the method for determining an orientation of a local line segment in a contour in a local area of a binary contour image, according to the fourth aspect of the present invention:

the numbers of pixels located in a plurality of orientations from one of the pixel(s) located in the local area and having a predetermined value is obtained (step 101);

a sum of the numbers of pixels in orientations adjacent to each orientation on both sides thereof, is obtained (step 102);

a difference between the number of pixels located in each orientation and the above sum, is obtained (step 107); and two orientations in which the differences are the largest and the second largest, respectively, are detected, and it is determined that line segments exist in the two orientations (step 108).

The above processing in the third and fourth aspects of the present invention can be performed in the respective local areas in the centers of which a plurality of pixels having the predetermined value in the binary contour image are located, respectively.

The above plurality of pixels respectively located at the centers of the plurality of local areas may be all of the pixels having the predetermined value in the binary contour image.

According to the present invention, a distribution of line segments in all of the areas of the above contour image is recognized. Further, contour lines (curves and straight lines) in all of the areas of the above contour image are recognized by synthetically analyzing these line segments.

The plurality of orientations in the above third and fourth aspects of the present invention can be obtained by determining an angle made between a straight line passing through each of the pixels having the above predetermined value in each of the above local area and the center pixel in the local area, and a straight line in a predetermined orientation passing through the center pixel.

In the above third and fourth aspects of the present invention, the above counting operation of the number of pixels having the predetermined value and located in each of the plurality of orientations, can be performed by counting the number of pixels located in each section of a pattern containing a plurality of sectorial areas each of which is arranged in a predetermined range of azimuth from the center pixel.

In the above third and fourth aspects of the present invention, the above counting operation of the number of pixels having the predetermined value and located in each of the plurality of orientations, can be performed by counting the number of pixels located in each section of a second pattern containing a plurality of sectorial areas each of which is arranged in the predetermined range of azimuth from the center pixel, and the locations of the sectorial areas in the second pattern is shifted from the locations of the sectorial areas in the above pattern by half of the predetermined range of azimuth.

In the above third and fourth aspects of the present invention, the above determination of orientations may be waived for a center pixel when no other pixel having the above predetermined value is contiguous to the center pixel, since the center pixel is considered to be isolated from the other pixel having the above predetermined value.

In the above third and fourth aspects of the present invention, the above determination of orientations may be waived when all of the pixels contiguous to the center pixel have the same value as the center pixel since the center pixel is considered not to be a constituent of a line segment.

Figure 17:
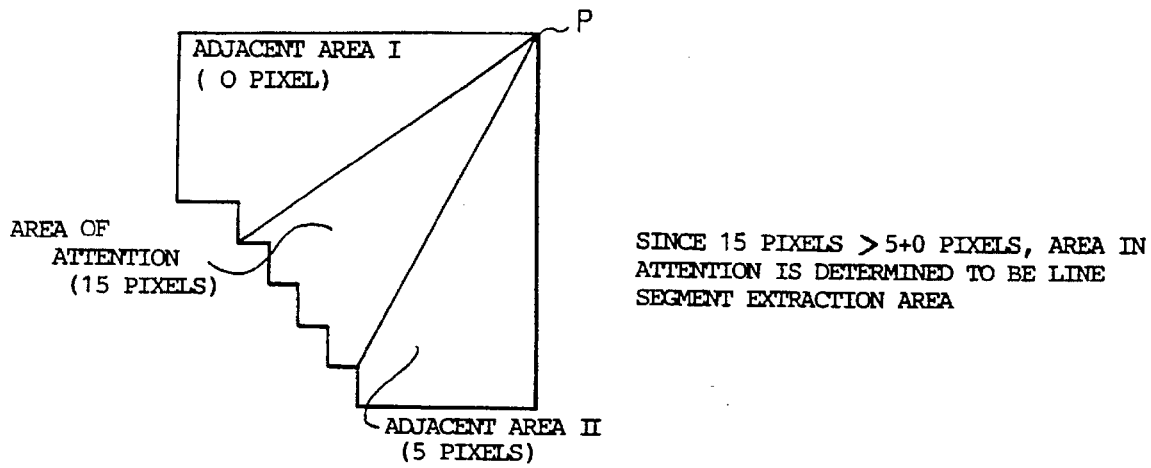
FIG. 17 is an explanatory diagram of the determination of the orientation according to the present invention.

FIG. 17 is a diagram illustrating an example of the determination of an orientation, which is characteristic to the third aspect of the present invention. Attention is given to each of partial areas corresponding to a plurality of orientations in a local area having a pixel P at the center of the local area, and a sum of the counts (the numbers of pixels having the same value as the pixel P) in the adjacent partial areas I and II on both sides of the above partial area to which the attention is given. In the case of FIG. 17, the count (the number of pixels having the same value as the pixel P) of the partial area of attention is equal to fifteen, and the counts in the adjacent partial areas I and II are zero and five, respectively. Therefore, the sum of the counts in the partial areas I and II is equal to five. When comparing the count, fifteen, in the partial area of attention with the sum, five, it is determined that the count, fifteen, is greater than the sum, five. Thus, the orientation corresponding to the partial area of attention is determined as an orientation of a line segment.

Figure 18:
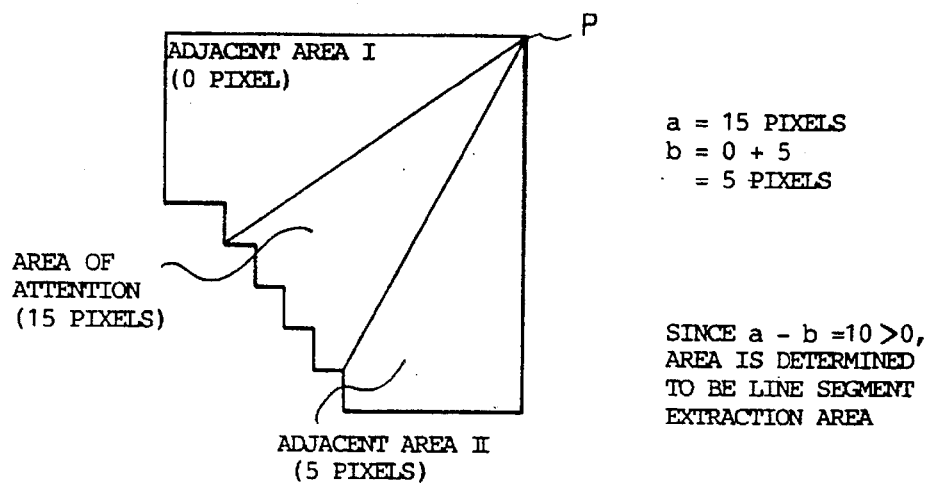
FIG. 18 is an explanatory diagram of the determination of the orientation according to the present invention.

FIG. 18 is a diagram illustrating the case wherein the above comparison is realized by a step of obtaining a difference between the count in each of partial areas (the partial area of attention) corresponding to a plurality of orientations in a local area having a pixel P at the center of the local area and a sum of the counts in the partial areas on both sides of the partial areas of attention, and a step of comparing the difference with zero.

The difference between the count, fifteen, and the above sum, is ten. When comparing ten with zero, 10 is greater than zero. Therefore, the orientation of the partial area of attention is determined as an orientation of a line segment.

Embodiment of Third And Fourth Aspects of Present Invention (FIGS. 19 to 24)

Figure 19:
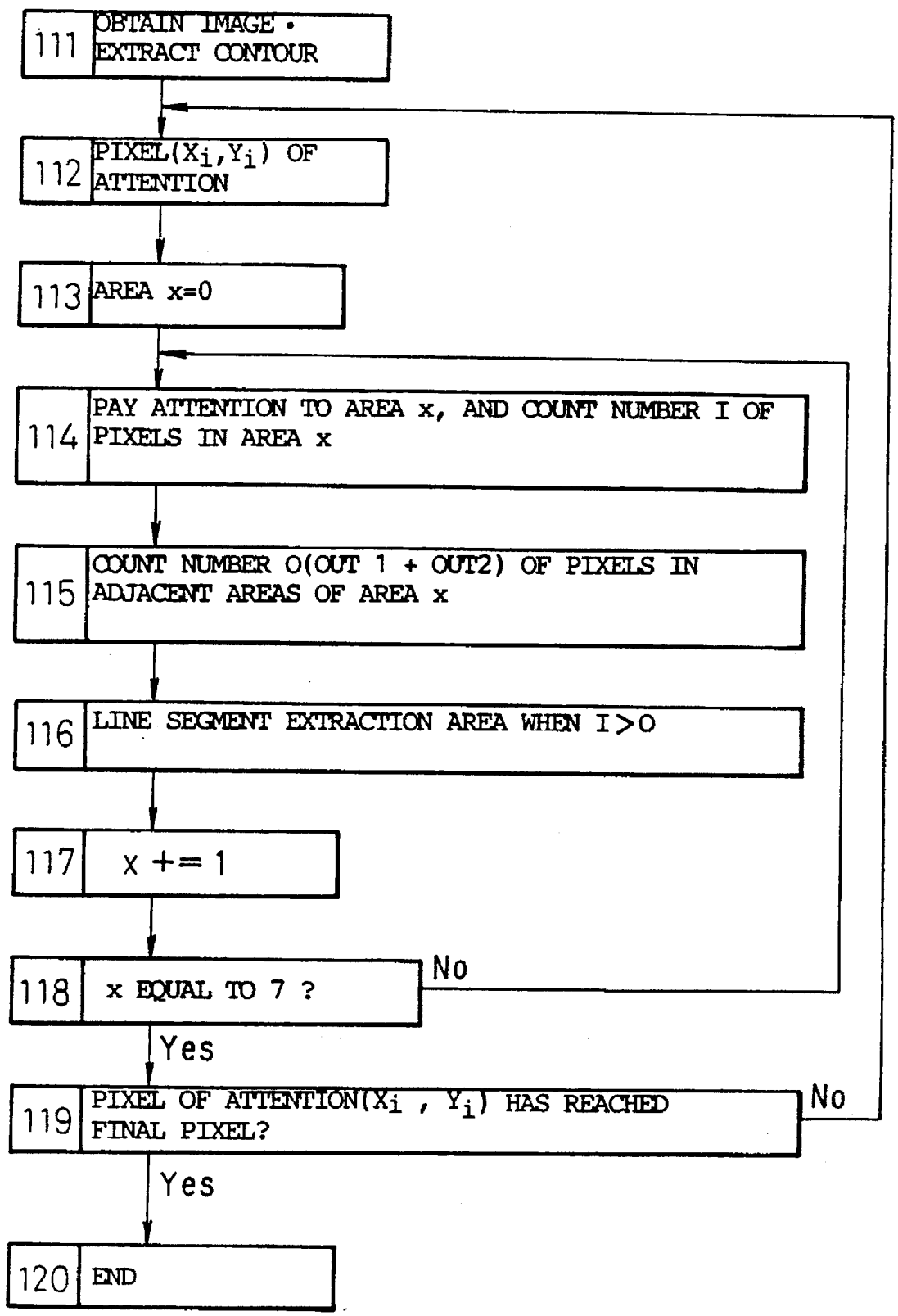
FIG. 19 is a diagram indicating an algorithm for detecting a line segment in a local area in the first embodiment of the third aspect of the present invention.

FIG. 19 is a diagram indicating an algorithm for detecting a line segment in a local area in the first embodiment of the third aspect of the present invention.

In FIG. 19, in step 111, an original image is obtained, and a contour line is extracted. Then, in steps 112 to 119, attention is given in turn to each pixel constituting the above contour line as a pixel of interest, and then an orientation of the line segment around each pixel of interest is obtained. In step 112, an attention is given to a pixel at coordinates (Xi,Yi) as the above pixel of interest. In step 113, an index x designating each of a plurality of partial areas around the pixel of interest is set to zero. Then, in step 114, the number I of pixels in the above partial area x is counted. Next, in step 115, a sum O of the numbers of pixels in partial areas located adjacent to the partial area x and on both sides of partial area x is counted. In step 116, the count I in the above partial area x is compared with the sum O of the numbers of pixels in partial areas located adjacent to the partial area x and on both sides of partial area x. When it is determined that I>O, the orientation of the partial area x is extracted as an orientation of the line segment passing through the pixel of interest (Xi,Yi) is extracted. In step 117, the above index x is incremented, and a next partial area is designated. The above operations in steps 114 to 117 are repeated until x has reached seven (since, in this example, as in FIG. 14, the area around the pixel of interest is divided into eight partial areas corresponding to eight orientations, the index i designating the partial area varies from zero to seven). Further, the operations in steps 112 to 118 are performed until it is determined in step 119 that the operations have been performed for all of the pixels extracted above.

Figure 20:
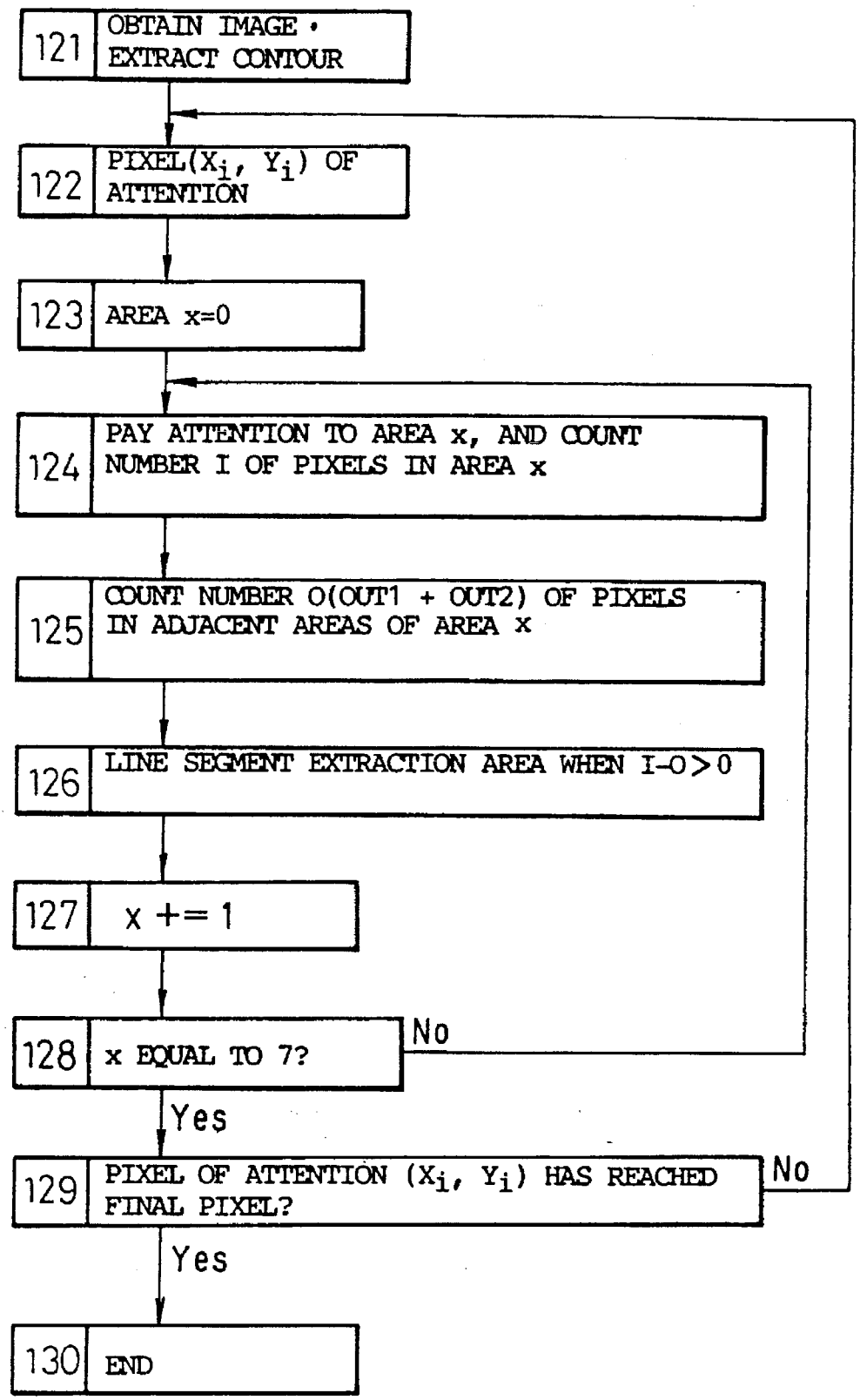
FIG. 20 is a diagram indicating an algorithm for detecting a line segment in a local area in the second embodiment of the third aspect of the present invention.

FIG. 20 is a diagram indicating an algorithm for detecting a line segment in a local area in the second embodiment of the third aspect of the present invention.

The procedure in FIG. 20 is different from the procedure in FIG. 19 only in that the step 126 of FIG. 20 is different from the step 16 in FIG. 19, and the other steps in FIG. 20 are the same as the steps in FIG. 19. In step 126 of FIG. 20, the count I in the partial area x is not directly compared with the sum O of the numbers of pixels located adjacent to the partial area x and on both sides of the partial area x. First, a difference between the count I in the partial area x and the sum O of the numbers of pixels located adjacent to the partial area x and on both sides of the partial area x is calculated, and then the difference is compared with zero. When it is determined that the difference is greater than zero, the orientation of the partial area x is extracted as an orientation of a line segment passing through the pixel of interest (Xi,Yi).

Figure 21:
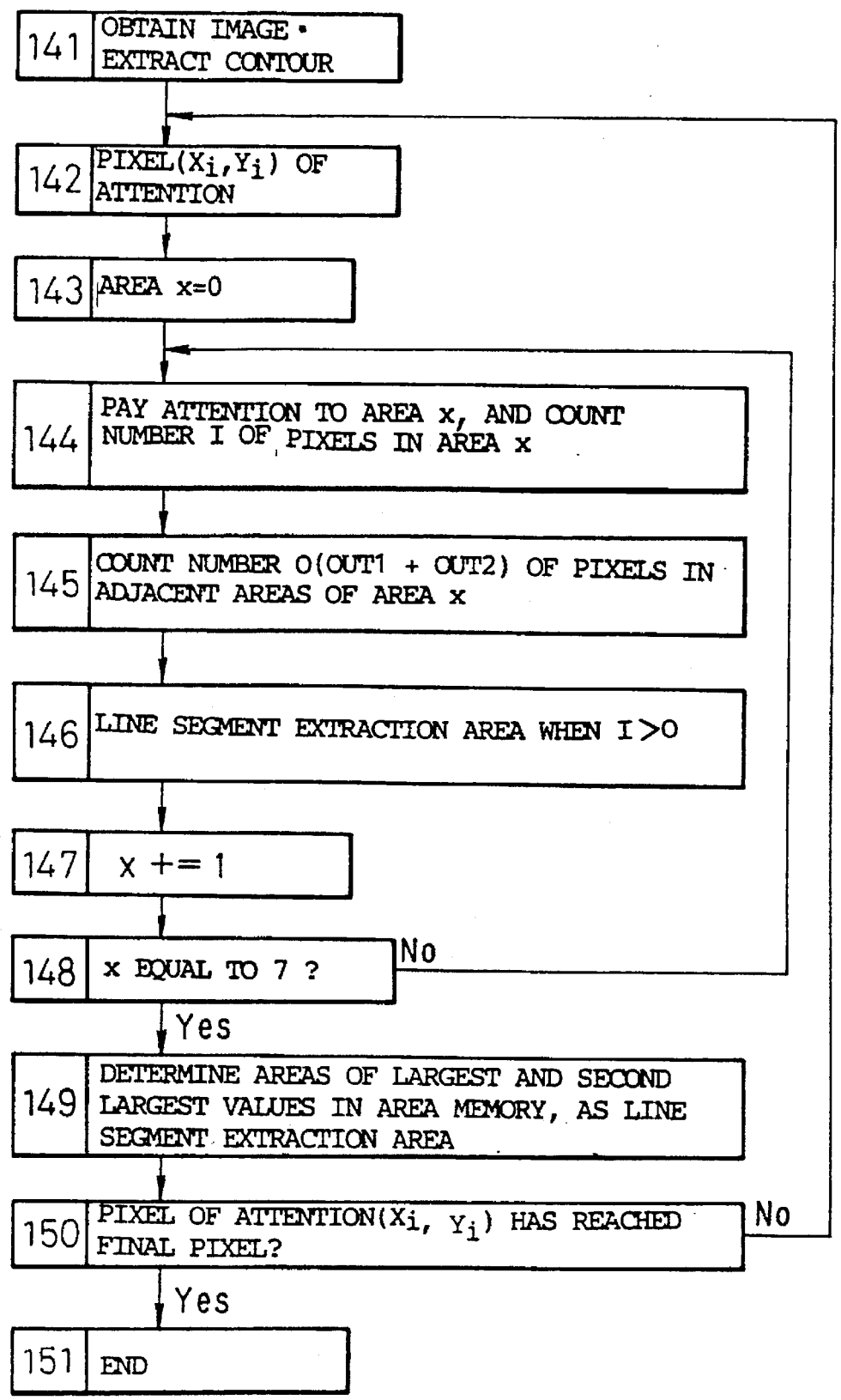
FIG. 21 is a diagram indicating an algorithm for detecting a line segment in a local area in the embodiment of the fourth aspect of the present invention.

FIG. 21 is a diagram indicating an algorithm for detecting a line segment in a local area in the embodiment of the fourth aspect of the present invention.

The operations in steps 141 to 145, and 150 of FIG. 21 correspond to the operations in steps 111 to 115, and 119 of FIG. 19, and the operations in steps 121 to 125, and 129 of FIG. 20. In the procedure of FIG. 21, in step 146, the difference between the count I in the partial area x and the sum O in the partial areas on both sides of the partial area x is calculated, and the result is stored in a memory. Then, a difference between a count I in each of all of the partial areas and a sum O of counts in the partial areas on both sides of the each partial area is calculated, and the result is stored in the memory. Next, in step 149, an orientation of one of the partial areas in which the above difference is the largest, and an orientation of another of the partial areas in which the above difference is the second largest, are extracted as orientations in which line segments exist.

Figure 22:
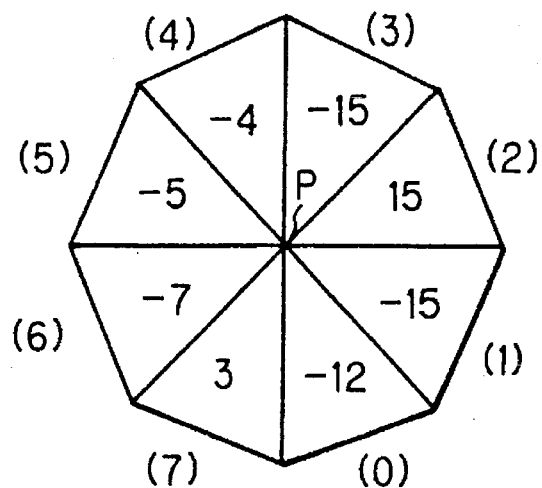
FIG. 22 is a diagram illustrating a pixel number distribution as a result of application of the processing of the third aspect of the present invention, to the pixel number distribution of FIG. 14.

FIG. 22 is a diagram illustrating a result of application of the processing as explained with reference to FIGS. 17 and 18, to the pixel number distribution of FIG. 14.

According to the procedure of FIG. 21, the orientations (2) and (7) are extracted as orientations of line segments passing through the pixel P. The influence by noise as indicated in FIG. 14 is completely suppressed in this result.

Figure 23:
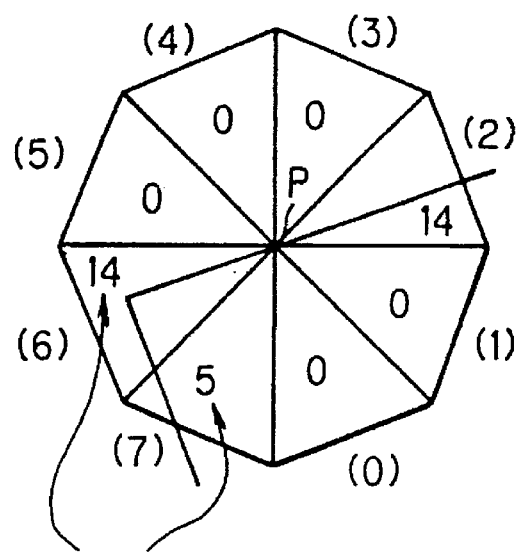
FIG. 23 is a diagram illustrating is an example of other pixel number distribution.
Figure 24:
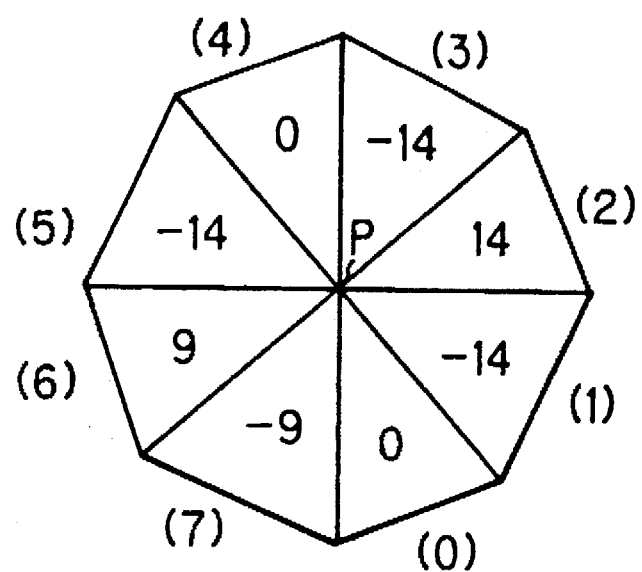
FIG. 24 is a diagram illustrating an example of a result of application of the processing according to the third aspect of the present invention, to the distribution of FIG. 23.

FIG. 23 is a diagram illustrating another example of a pixel number distribution which is different from the distribution of FIG. 14, and FIG. 24 is a diagram illustrating a result of application of the above processing according to the present invention, to the distribution of FIG. 23. As indicated in FIG. 24, the orientation of a line segment becomes very clear due to the processing according to the present invention.

As explained above, by the method for determining an orientation of a line segment in a contour in a local area of a binary contour image according to the first and second aspects of the present invention, a local line segment in an image can be detected by a simple processing suppressing an influence by noise.

Basic Construction of Fifth Aspect of Present Invention

In the method for detecting a line segment from a contour in a binary contour image, according to the fifth aspect of the present invention, the following operations are performed.

In the first step, the numbers of pixels each having a predetermined value and located in each of a plurality of sectorial areas each of which arranged in a predetermined range of azimuth at each of a plurality of pixels respectively located at the centers of a plurality of local areas and each having the above predetermined value, is counted.

In the second step, it is determined in each of the plurality of local areas that a local line segment exists in an orientation corresponding to one of the sectorial areas when the number of pixels located in the sectorial area is greater than a predetermined value.

In the third step, it is determined in each of the plurality of local areas that a local line segment of a straight-line form passing through the pixel exists in the local area when two local line segments are determined to exist in the second step, and the orientations of the two local line segments differ by 180° from each other.

In the fourth step, it is determined that a group of pixels is a candidate of a line segment when the pixels in the group are contiguously arrayed and it is determined that local line segments in the same orientation pass through the respective pixels in the respective local areas.

The above orientation of the line segment may be obtained by any of the various ways as explained before (the first to fourth aspects of the present invention).

Figure 27:
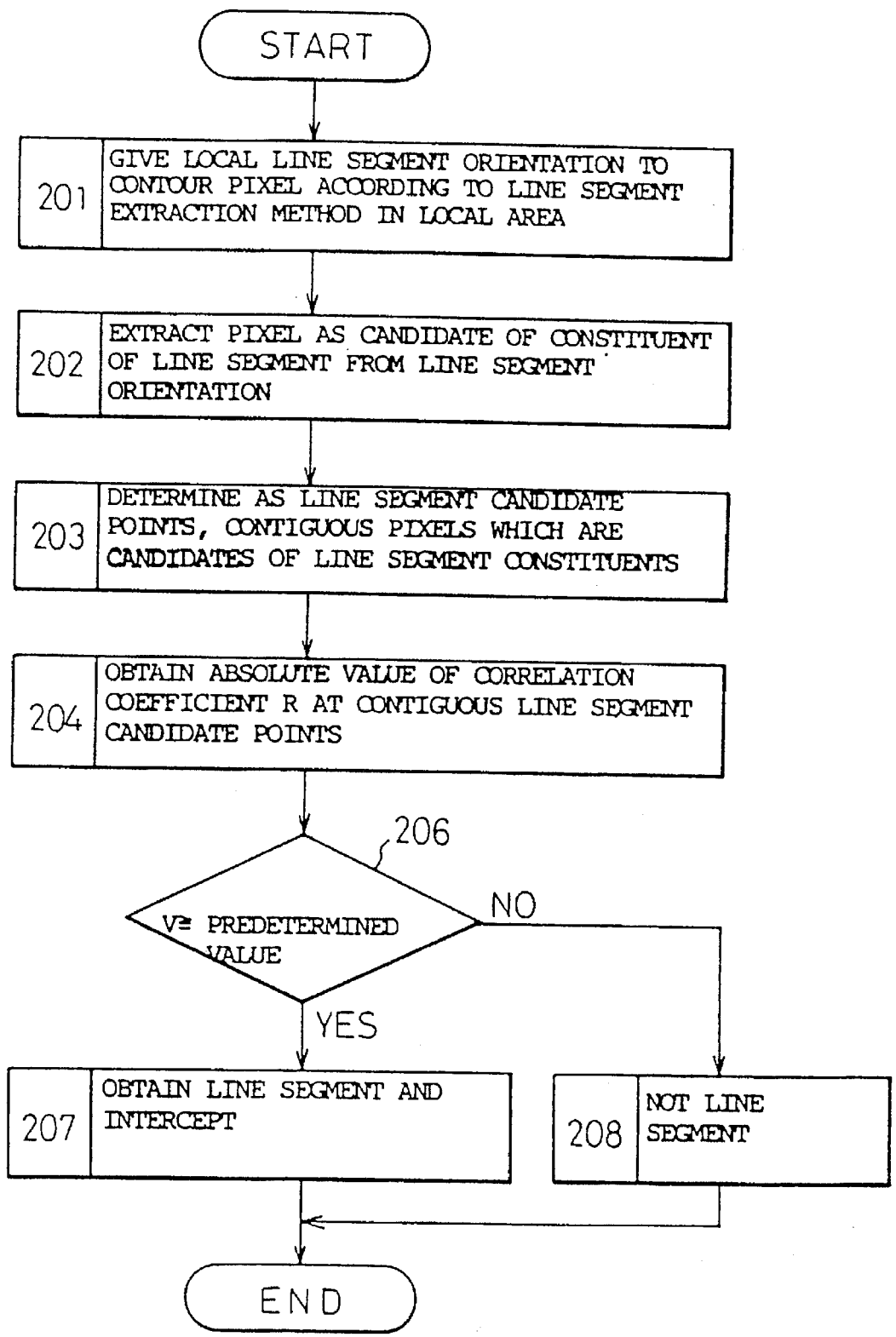
FIG. 27 is a diagram indicating an algorithm for detecting a line segment in an embodiment of the fifth aspect of the present invention.

Embodiment of Fifth and Seventh Aspects of Present Invention (Table, And FIGS. 25 To 27)

In an embodiment of the fifth aspect of the present invention, the patterns of FIGS. 12 and 13 are used for determining orientations of local line segments around each contour point. Each of the patterns of FIGS. 12 and 13 contains areas in eight orientations, where each area is located in an azimuth range of 45°. By using these two patterns, sixteen orientations, 0 to 15, as indicated in Table and FIG. 25, are obtained.

For example, when a straight line 400 in a contour line passes through the center pixel G around which an orientation of a line segment is to be detected, peaks of the number of pixels are detected in the orientations 1 and 5 as indicated in FIG. 26A, and peaks of the number of pixels are detected in the orientations 1 and 5 as indicated in FIG. 26B. Thus, as indicated in Table and FIG. 26C, existence of a peak of the number of pixels is detected in the orientation 3–11 among the sixteen orientations.

FIG. 27 is a diagram illustrating an algorithm for detecting a line segment in the embodiment of the fifth aspect of the present invention. In step 201 of FIG. 27, orientations of local line segments are determined according to the first to fourth aspects of the present invention as explained above. In this step, orientations in which the numbers of pixels in contour points are greater than a predetermined value are detected in a local area having each contour point at the center of the local area. Next, in step 202, it is determined that a local line segment passing through the contour point exists when two of the orientations obtained in step 201 differ from each other by 180°. For example, among the sixteen orientations of FIG. 25, the orientation 3 differs from the orientation 11 by 180°. Then, in step 203, it is determined that a group of pixels is a candidate of a line segment when the pixels in the group are contiguously arrayed and it is determined that local line segments in the same orientation pass through the respective pixels in the respective local areas. In this embodiment, further, in step 204, a correlation coefficient is obtained from coordinates of the above contiguous pixels included in the above group of pixels for example, according to the following equation.

$$R = (\Sigma X_i Y_i / N - X_m Y_m) \sigma x \sigma y$$

where R denotes a correlation coefficient, N denotes the number of pixels in the group which is determined as a candidate of a line segment, $X_i$ and $Y_i$ denote X- and Y-coordinates of each pixel in the above group, $X_m$ and $Y_m$ denote average values of the X- and Y-coordinates of each pixel in the above group, and sx and sy denote standard deviations of the X- and Y-coordinates of each pixel in the above group.

In step 206, it is determined whether or not the correlation coefficient obtained as above is greater than a predetermined value. When it is determined that the correlation coefficient obtained as above is greater than a predetermined value, the operation goes to step 207 to determine that the above group of pixels constitutes a line segment, and to obtain an inclination of the line segment and a coordinate of an intercept (end point) of the line segment. When it is determined that the correlation coefficient obtained as above is not greater than a predetermined value, the operation goes to step 208 to determine that the above group of pixels constitutes a line segment.

Further, when detecting a line segment in the above step 206, according to the seventh aspect of the present invention, a series of contiguous pixels containing, in addition to the local line segment of the straight-line form in the same orientation, a local line segment of the sub-straight-line form the orientation of which is within a predetermined range of angle from the same orientation, may be determined as a candidate of a line segment.

Embodiment of Sixth and Eighth Aspects of Present Invention (FIGS. 28 to 31)

Figure 28:
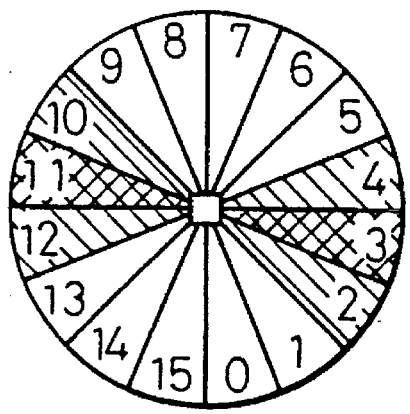
FIG. 28 is a diagram indicating a definition of the sub-straight-line form in the embodiment of the sixth aspect of the present invention.

Next, the case wherein a line segment is obtained basically according to the above fifth aspect of the present invention, is considered. Here, the local line segment detected in the second step of the fifth aspect of the present invention in the orientation in which the number of pixels of the contour points in each of the local areas respectively having the contour points at their center pixels is the largest, is denoted by a first orientation; and the local line segment detected in the second step of the fifth aspect of the present invention in the orientation in which the number of pixels of the contour points in each of the local areas respectively having the contour points at their center pixels is the second largest, is denoted by a second orientation. The first and second local line segments which are determined in the above second step, are detected as constituents of a local line segment of a sub-straight-line form when the orientation of the second local line segment differs from the orientation of the first local line segment by an angle not equal to 180° and within a predetermined range of azimuth from the orientation of the first local line segment. For example, around the orientation 3–11, which is detected as a constituent of a local line segment in step 202 of FIG. 27, the orientations 3–10, 2–11, and 4–11 as indicated in FIG. 28, are detected as the local line segment of the sub-straight-line form. Next, when each of first and second series of pixels are determined as a candidate of a line segment in step 203 of FIG. 27 (or as constituents of a line segment in step 207 of FIG. 27), and the first and second series of pixels are connected by a third series of contiguously arrayed pixels, the third series of pixels is determined as a connection portion connecting the line segments respectively constituted by the first and second series of pixels when the following conditions are satisfied. The above conditions are: a plurality of first local line segments in a first orientation pass through the pixels constituting the first series of pixels, respectively; a plurality of second local line segments in a second orientation pass through the pixels constituting the second series of pixels, respectively; a line segment of the sub-straight line form is detected at each of the pixels constituting the third series of pixels; an orientation of one of the first and second local line segments constituting the line segment of the sub-straight line form at a first pixel in the third series of pixels adjacent to the first series of pixels is equal to the above first orientation; an orientation of one of the first and second local line segments constituting the line segment of the sub-straight line format a second pixel in the third series of pixels adjacent to the second series of pixels is equal to the above second orientation; and the third series of pixels does not contain a candidate of a line segment.

Figure 29:
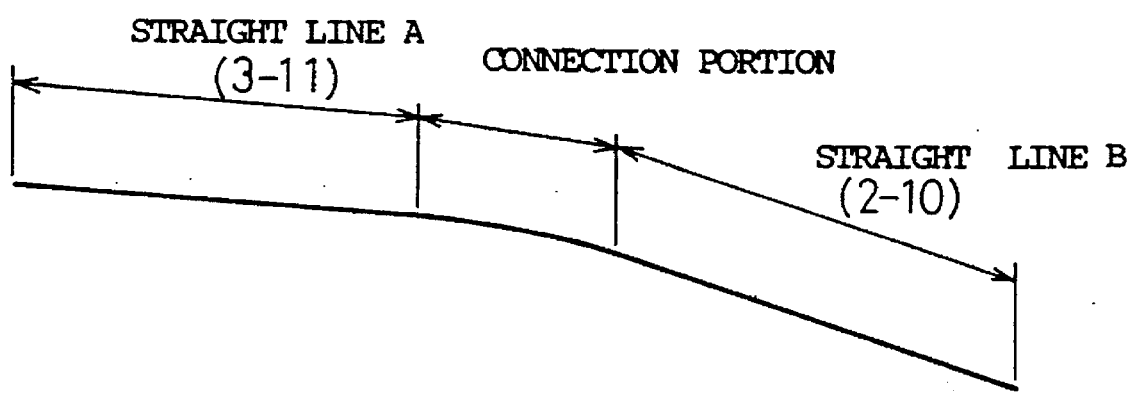
FIG. 29 is a diagram illustrating an example of a smooth connection between two line segments through a curve.

The connection portion may be a curve portion smoothly connecting two line segments, as indicated in FIG. 29. Or, two line segments may directly intersect with each other, i.e., the line segments may extend to their intersecting point. In the case wherein the two line segments directly intersect with each other, when the number of pixels in the orientation to the above intersecting point is counted from a pixel constituting one of the line segments, located within a distance equal to the size of a local area, from the intersecting point of the line segments, the pixel constituting the other of the line segments may be included in the count. Therefore, when the difference between the orientations of the two line segments is not so large, the "local line segment of the sub-straight-line form" may be detected at the pixel located within a distance equal to the size of a local area, from the intersecting point.

The above connection portion can be obtained according to the eighth aspect of the present invention as follows.

When first and second candidates of line segments are obtained under the condition that each of the first and second candidates contains a pixel through which a local line segment of the straight-line form passes, and may further contain a pixel through which a local line segment of the sub-straight-line form passes, and the first and second series of pixels share at least one pixel (i.e., the first and second series of pixels are connected by at least one contour point); it is determined that the first candidate is a first line segment extending to one of the at least one pixel in the series of pixels of the first candidate, located nearest the above pixel shared by the first and second candidates; the second candidate is a second line segment extending to one of the at least one pixel in the series of pixels of the second candidate, located nearest the above pixel shared by the first and second candidates, and the first and second line segments are connected by a connection portion constituted by pixels contiguously arrayed between the first and second pixels.

Figure 32:
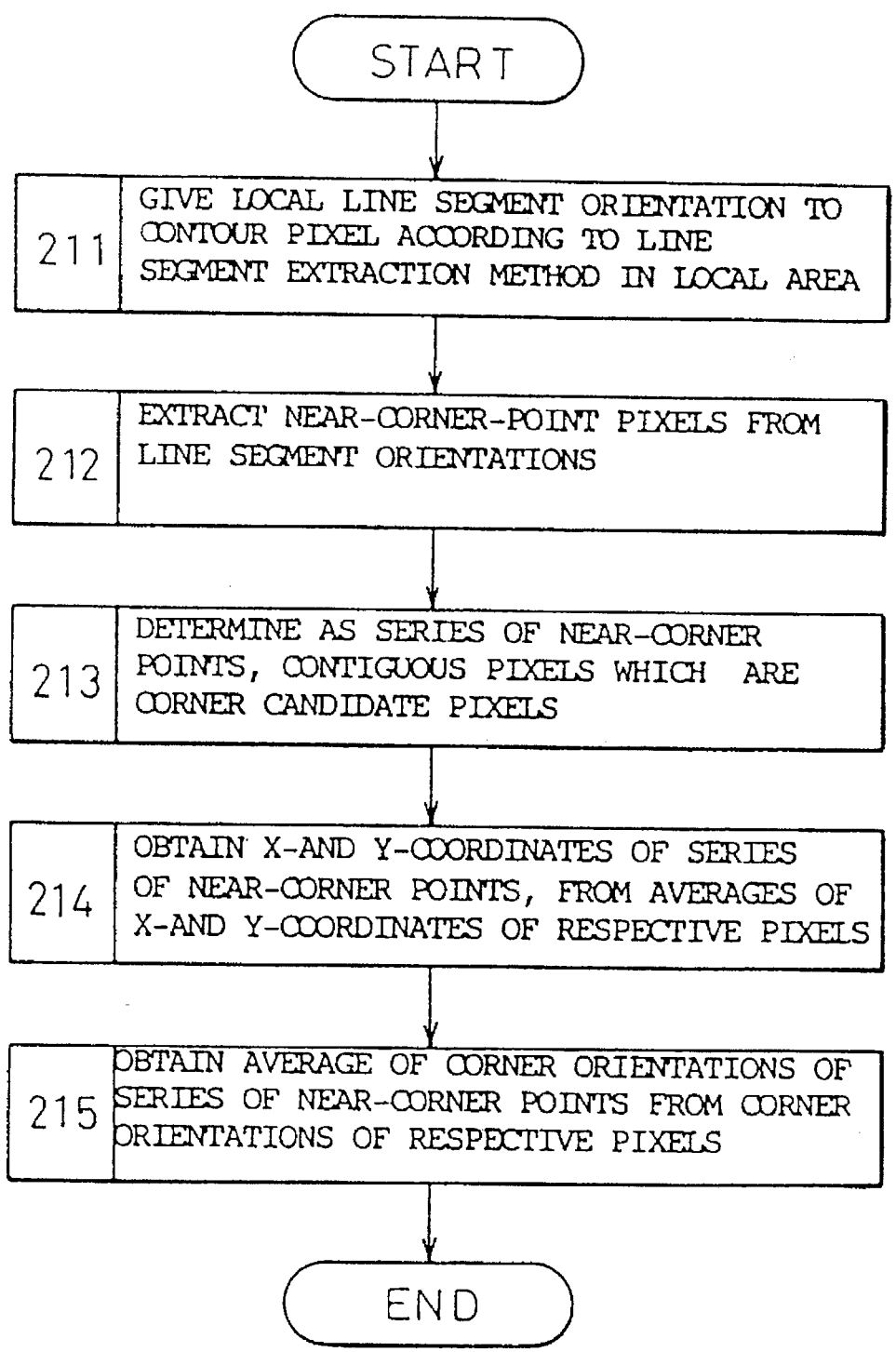
FIG. 32 is a diagram indicating an algorithm for detecting a corner in an embodiment of the ninth aspect of the present invention.
Figure 33:
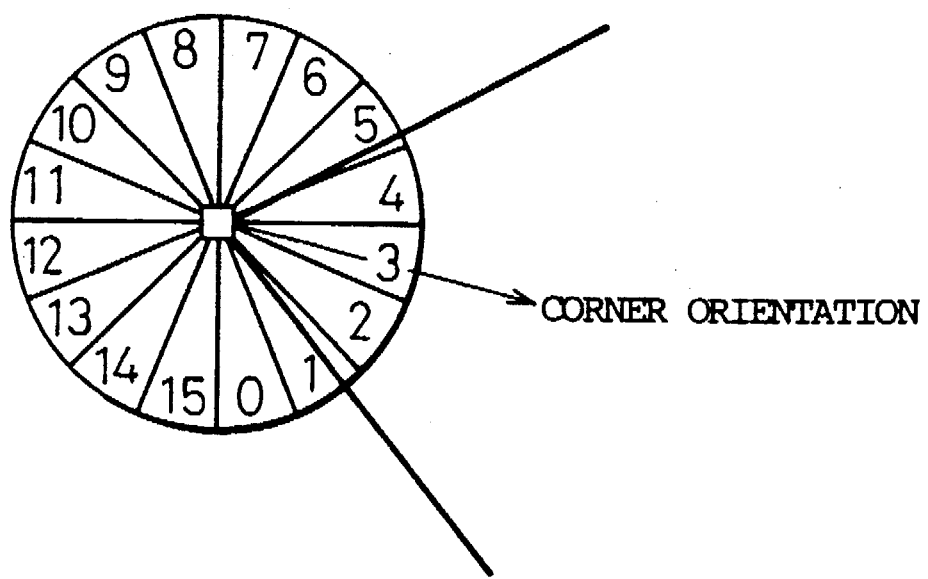
FIG. 33 is a diagram indicating a definition of the corner orientation in the embodiment of the ninth aspect of the present invention.

Embodiment of Ninth Aspect of Present Invention (FIGS. 32 and 33)

Figure 30:
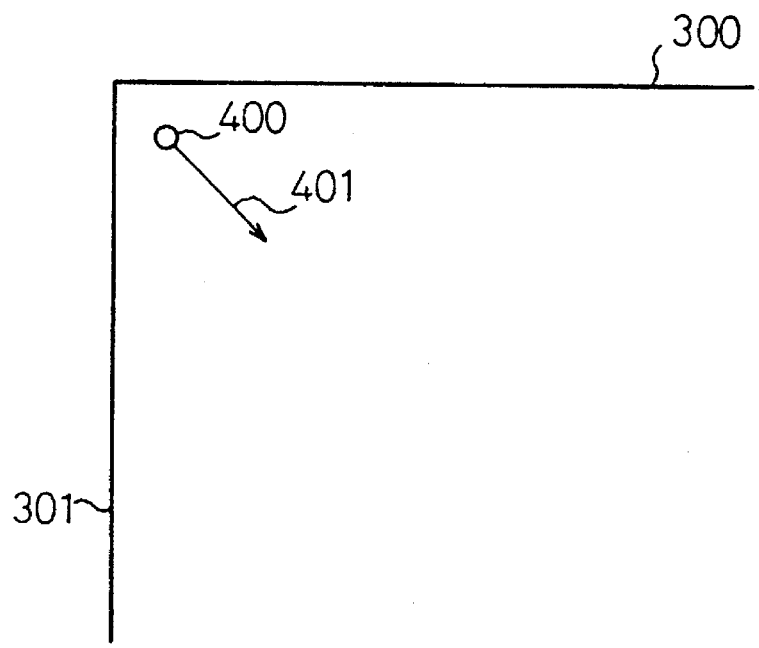
FIG. 30 is a diagram illustrating an intersecting point of two line segments, a representative value (position) of a corner detected corresponding to the intersecting point, and a representative value (orientation) of a corner orientation.
Figure 31:
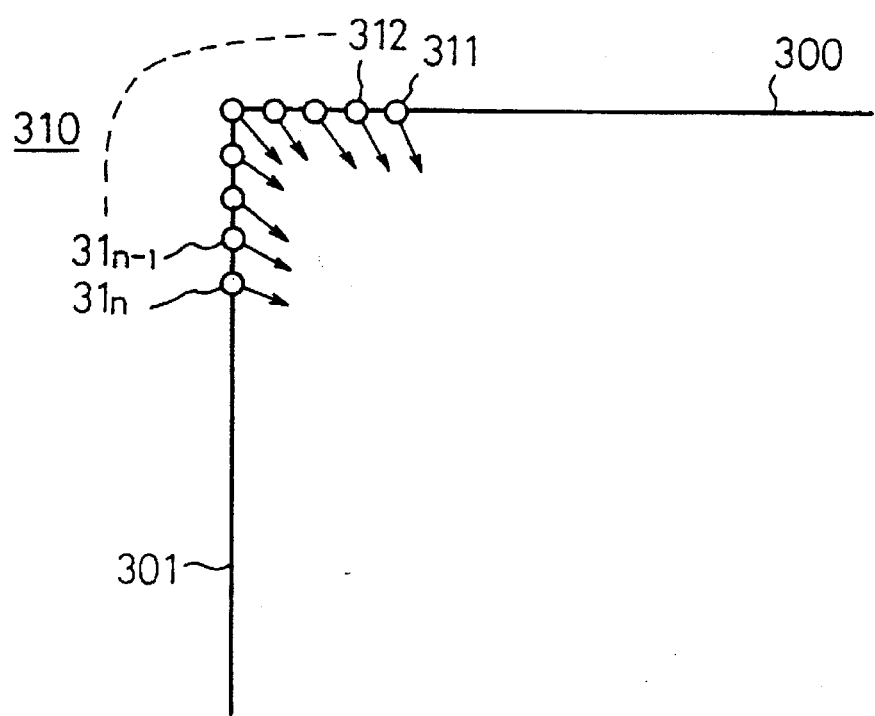
FIG. 31 is a diagram illustrating corner orientations detected at the respective points of a series of near-corner points in the vicinity of the intersecting point of two line segments.

FIG. 32 is a diagram indicating an algorithm for detecting a corner in an embodiment of the ninth aspect of the present invention. In step 211 of FIG. 32, according to the first to fourth aspects of the present invention, orientations of local line segments around each contour point are determined. The determination is made based on that the numbers of contour points in the orientations in a local area having each contour point at the center of the local area, are greater than a predetermined value. Next, in this embodiment, in step 212, it is determined that the pixel located at the center of the local area as a near-corner point when a difference between 180° and a difference between the orientations of the two local line segments determined in the second step exceeds a predetermined angle value. Then, in step 213, a group of pixels which are determined as the near-corner point, and are arrayed contiguously, is obtained. Next, in step 214, for each group (series of near-corner points), average values of X- and Y-coordinates of the respective pixels in the group are obtained as representative values of the group (series of near-corner points). Further, in step 215, a mean of orientations of two local line segments in the local area having each pixel in the group at the center of the local area, is obtained as a corner orientation. For example, at a corner made by an intersection of the two line segments 300 and 301 as indicated in FIGS. 30 and 31, corner orientations of the respective pixels in the connection portion detected as indicated by 311 to 31n in FIG. 31. Then, in each group, an average of corner orientations of all of the pixels in the group is obtained as a representative value (FIG. 33). In the example of FIG. 30, a representative value of the group (the average values of the series of near-corner points) is obtained at the location indicated by 400, and a representative value (average value) of the corner orientations is obtained as indicated by 401.

Figure 34:
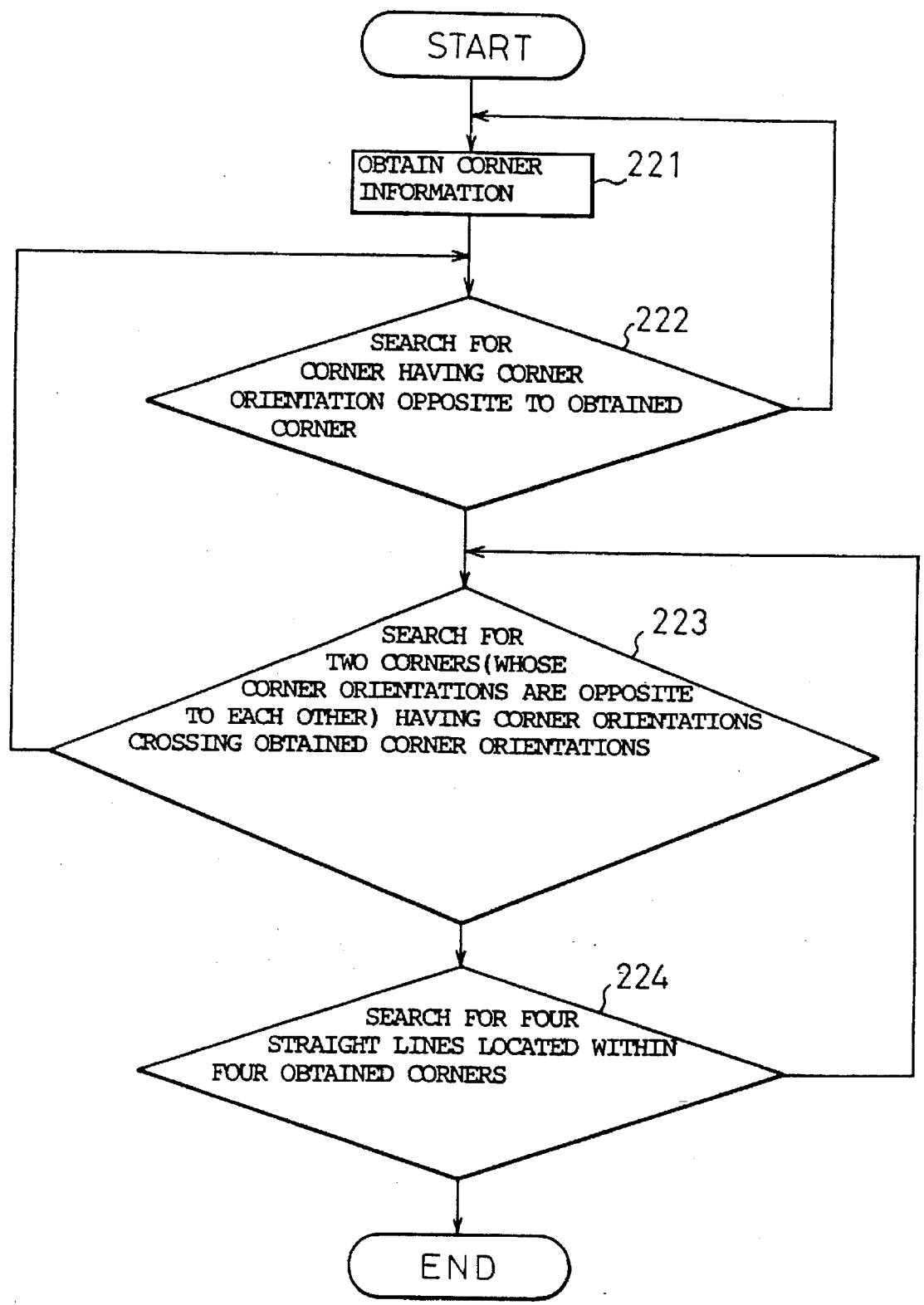
FIG. 34 is a diagram indicating an algorithm for detecting a tetragon in an embodiment of the tenth aspect of the present invention.
Figure 35:
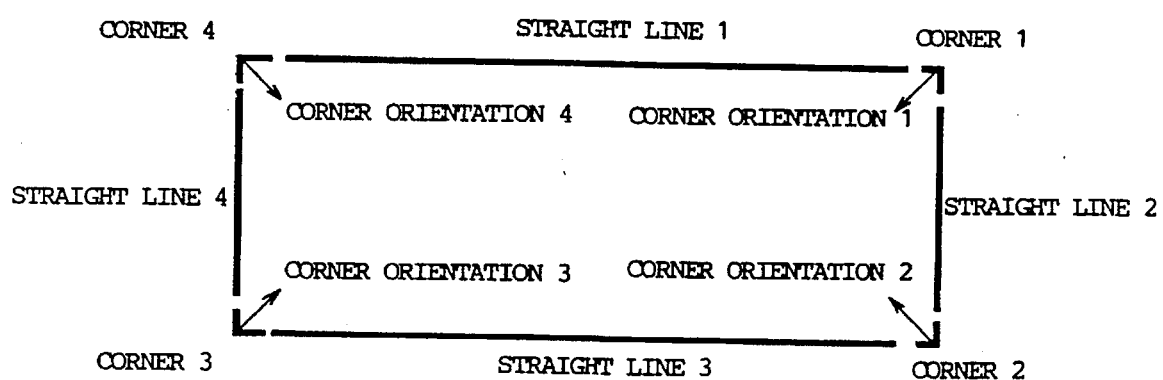
FIG. 35 is a diagram illustrating an example of a tetragon detected in the tenth aspect of the present invention.

Embodiment of Tenth Aspect of Present Invention (FIGS. 34 and 35)

Information on the inclinations of line segments, the intercepts of the line segments, positions of corners (representative values of coordinates), and representative values of orientations of corners, as obtained above, is stored in a database. According to the tenth aspect of the present invention, a tetragon formed by contour lines is detected by using the above information. FIG. 34 is a diagram indicating an algorithm for detecting a tetragon in an embodiment of the tenth aspect of the present invention. In step 221 of FIG. 34, in accordance with the procedure explained as above, information on the representative values of a position (representative values of coordinates) and the representative value of an orientation of a corner (for example, the corner 1 in FIG. 35) is obtained. Then, in step 222, a corner (for example, the corner 3 in FIG. 35) in a corner orientation opposite (different by 80°) to the corner orientation of each corner obtained as above, is obtained to make a pair of corners in opposite orientations. In step 223, in a pair of groups (series of near-corner points) in which a pair of corners as above are formed, a line segment connecting the points of the representative values of the coordinates of the corners is obtained. Next, a combination of two pairs (for example, the corners 1 and 3, and the corners 2 and 4 in FIG. 35) in which the above line segments connecting the points of the representative values intersect. Then, in step 224, from among the line segments obtained as explained before, line segments connecting the four groups in the above two pairs (for example, the line segments 1, 2, 3, and 4 in FIG. 35) are searched to obtain as a tetragon.

Hardware Construction of Present Invention (FIG. 36)

FIG. 36 is a block diagram illustrating a hardware construction for executing the various methods according to the present invention. In FIG. 36, 400 denotes a television camera, 401 denotes a image input board, 402 denotes a image memory, 403 denotes a contour extraction. circuit, 404 denotes a central processing unit interface, and 405 denotes a central processing unit. In addition, the central processing apparatus 405 contains: the CPU (central processing unit) 406, the RAM (random access memory) 407, the ROM (read-only memory) 408, the keyboard interface 409, the keyboard 410, the display interface 411, the display 412, and the magnetic disk device 413.

The television camera 400 shots an object to be recognized, and supplies image information, for example, as an NTSC image signal, to the image input board 401. The image input board 401 digitizes the NTSC image signal by using an analog to digital converter (not shown), and stores the digitized image data in the image memory 402. The contour extraction circuit 403 reads the image data stored in the image memory 402 to extract contour points of the image. The extraction of the contour points may be performed by any of known methods. For example, the extraction may be performed by the zero-cross processing. The data of the extracted contour points is supplied through the central processing unit interface 404 to the central processing apparatus 405. The central processing apparatus 405 stores the data of the contour points in the RAM 407 or the magnetic disk device 413 under the control of the CPU 406. In the magnetic disk device 413 in the central processing apparatus 405, programs for performing the various methods according to the present invention are stored. When the central processing apparatus 405 is started, these programs are written on the RAM 407, and the various methods according to the present invention are performed in accordance with operations by an operator from the keyboard 410. The result obtained by the above processing is displayed on the display 412. The registers indicated in FIG. 7 may be areas provided in the RAM 407.

TABLE

Pattern for Line Segment Orientation

| Orientation of Line Segment of FIG. 25 | Area in Pattern of FIG. 12 | Area in Pattern of FIG. 13 |
| --- | --- | --- |
| 0 | 0 | 7 |
| 1 | 0 | 0 |
| 2 | 1 | 0 |
| 3 | 1 | 1 |
| 4 | 2 | 1 |
| 5 | 2 | 2 |
| 6 | 3 | 2 |
| 7 | 3 | 3 |
| 8 | 4 | 3 |
| 9 | 4 | 4 |
| 10 | 5 | 4 |
| 11 | 5 | 5 |
| 12 | 6 | 5 |
| 13 | 6 | 6 |
| 14 | 7 | 6 |
| 15 | 7 | 7 |

LIST OF REFERENCE NUMERALS

400 . . . television camera,
401 . . . image input board,

402 ... image memory,
403 ... contour extraction circuit,
404 ... central processing unit interface,
405 ... central processing unit,
406 ... CPU,
407 ... RAM,
408 ... ROM,
409 ... keyboard interface,
410 ... keyboard,
411 ... display interface,
412 ... display
413 ... magnetic disk device

We claim:

1. A method for determining an orientation of a local line segment in a contour in a local area of a binary contour image, comprising:

a first step for obtaining the numbers of pixels each having a predetermined value and located in a plurality of orientations around one of pixels located in the local area and having said predetermined value; and a second step for determining that a local line segment exists in an orientation in which the number of pixels located in the orientation is greater than a predetermined value.

2. A computer readable product storing at least one program, for determining an orientation of a local line segment in a contour in a local area of a binary contour image, in a storage memory unit, where said at least one program when executed by a processing unit, causes the processing unit and its associated hardware to carry out the steps of:

a first step for obtaining the numbers of pixels each having a first predetermined value and located in a plurality of orientations around one of plural pixels, located in the local area and having said first predetermined value, wherein the pixels are stored in the storage memory unit; and a second step for determining that a local line segment exists in an orientation in which the number of pixels located in the orientation is greater than a second predetermined value using the processing unit.

3. A computer readable product storing at least one program, for determining an orientation of a local line segment in a contour in a local area of a binary contour image, in a storage memory unit, where said at least one program when executed by a processing unit, causes the processing unit and its associated hardware to carry out the steps of:

a first step for obtaining the numbers of pixels each having a first predetermined value and located in a plurality of orientations around each of a plurality of pixels respectively located at the centers of a plurality of local areas and each having said first predetermined value, wherein the pixels are stored in the storage memory unit; and a second step for determining in each of the plurality of local areas that a local line segment exists in an orientation in which the number of pixels located in the orientation is greater than a second predetermined value using the processing unit.

4. A computer readable product storing at least one program, for determining an orientation of a local line segment in a contour in a local area of a binary contour image, in a storage memory unit, where said at least one program when executed by a processing unit, causes the processing unit and its associated hardware to carry out the steps of:

a first step for obtaining the numbers of pixels located in a plurality of orientations around one of plural pixels, located in the local area and having a first predetermined value, wherein the pixels are stored in a storage memory unit;

a second step for determining whether or not the number of pixels located in each orientation is greater than a sum of the numbers of pixels in orientations adjacent to said each orientation on both sides thereof using the processing unit; and a third step for determining that a local line segment exists in said each orientation when the number of pixels located in each orientation is greater than a sum of the numbers of pixels in orientations adjacent to said each orientation on both sides thereof using the processing unit.

5. A computer readable product storing at least one program, for determining an orientation of a local line segment in a contour in a local area of a binary contour image, in a storage memory unit, where said at least one program when executed by a processing unit, causes the processing unit and its associated hardware to carry out the steps of:

a first step for obtaining the numbers of pixels each having a first predetermined value and located in a plurality of orientations around each of a plurality of pixels respectively located at the centers of a plurality of local areas and each having said first predetermined value, wherein the pixels are stored in the storage memory unit; and a second step for determining whether or not the number of pixels located in each orientation is greater than a sum of the numbers of pixels in orientations adjacent to said each orientation on both sides thereof using the processing unit; and a third step for determining that a local line segment exists in said each orientation when the number of pixels located in each orientation is greater than a sum of the numbers of pixels in orientations adjacent to said each orientation on both sides thereof using the processing unit.

6. A computer readable product storing at least one program, for determining an orientation of a local line segment in a contour in a local area of a binary contour image, in a storage memory unit, where said at least one program when executed by a processing unit, causes the processing unit and its associated hardware to carry out the steps of:

a first step for obtaining the numbers of pixels located in a plurality of orientations around one of plural pixels located in the local area and having a first predetermined value, wherein the pixels are stored in the storage memory unit;

a second step for obtaining a difference between the number of pixels located in each orientation and a sum of the numbers of pixels in orientations adjacent to said each orientation on both sides thereof using the processing unit; and a third step for determining that a local line segment exists in a certain orientation when the difference for the orientation is greater than a second predetermined value using the processing unit.

7. A computer readable product storing at least one program, for determining an orientation of a local line segment in a contour in a local area of a binary contour image, in a storage memory unit, where said at least one program when executed by a processing unit, causes the processing unit and its associated hardware to carry out the steps of:

a first step for obtaining the numbers of pixels each having a first predetermined value and located in a plurality of orientations around each of a plurality of pixels respectively located at the centers of a plurality of local areas and each having said first predetermined value, wherein the pixels are stored in the storage memory unit; and a second step for obtaining a difference between the number of pixels located in each orientation and a sum of the numbers of pixels in orientations adjacent to said each orientation on both sides thereof using the processing unit; and a third step for determining that a local line segment exists in a certain orientation when the difference for the orientation is greater than a second predetermined value using the processing unit.

8. A computer readable product storing at least one program, for detecting a line segment from a contour in a binary contour image, in a storage memory unit, where said at least one program when executed by a processing unit, causes the processing unit and its associated hardware to carry out the steps of:

a first step for counting the numbers of pixels each having a first predetermined value and located in each of a first plurality of sectorial areas around each pixel having the first predetermined value and located at the center of each of a plurality of local areas, and counting the numbers of pixels each having the first predetermined value and located in each of a second plurality of sectorial areas around said each pixel having the first predetermined value and located at the center of each of the plurality of local areas, where the locations of the second plurality of sectorial areas are different from the locations of the first plurality of sectorial areas, wherein the pixels are stored in the storage memory unit;

a second step for obtaining for each of the first and second patterns a difference between the number of pixels located in each orientation and a sum of the numbers of pixels in orientations adjacent to said each orientation on both sides thereof using the processing unit;

a third step for obtaining for each of the first and second patterns an orientation corresponding to one of the areas for which the difference is greater than a second predetermined value using the processing unit; and a fourth step for obtaining an overlapping area in which one of the first plurality of sectorial areas and one of the second plurality of sectorial areas are overlapped, where the number of pixels located in said one of the first plurality of sectorial areas is greater than the second predetermined value, and the number of pixels located in said one of the second plurality of sectorial areas is greater than the second predetermined value, respectively; and for determining that a local line segment exists in an orientation corresponding to said overlapping area using the processing unit.

9. A computer readable product storing at least one program, for detecting a line segment from a contour in a binary contour image, in a storage memory unit, where said at least one program when executed by a processing unit, causes the processing unit and its associated hardware to carry out the steps of:

a first step for obtaining the numbers of pixels each having a first predetermined value and located in each of a plurality of orientations around each of a plurality of pixels respectively located at the centers of a plurality of local areas and each having said first predetermined value wherein the pixels are stored in the storage memory unit;

a second step for determining in each of the plurality of local areas that a local line segment exists in a certain orientation when the number of pixels located in the orientation is greater than a second predetermined value using the processing unit;

a third step for determining in each of the plurality of local areas that a straight local line segment passing through said each of the plurality of pixels exists in the local area when two local line segments are determined to exist in the second step, and the orientations of the two local line segments differ by 180° from each other using the processing unit; and a fourth step for determining a group of pixels as a candidate of a line segment when the pixels in the group are contiguously arrayed and it is determined in the third step that local line segments in the same orientation pass through the respective pixels in the respective local areas using the processing unit.

10. A computer readable product storing at least one program, for detecting a line segment from a contour in a binary contour image, in a storage memory unit, where said at least one program when executed by a processing unit, causes the processing unit and its associated hardware to carry out the steps of:

a first step for counting the numbers of pixels each having a first predetermined value and located in each of a plurality of sectorial areas around each of a plurality of pixels respectively located at the centers of a plurality of local areas and each having said first predetermined value, wherein the pixels are stored in the storage memory unit;

a second step for determining in each of the plurality of local areas that a local line segment exists in an orientation corresponding to one of the sectorial areas when the number of pixels located in the sectorial area is greater than a second predetermined value using the processing unit;

a third step for determining in each of the plurality of local areas that a straight local line segment passing through said each of the plurality of pixels exists in the local area when two local line segments are determined to exist in the second step, and the orientations of the two local line segments differ by 180° from each other using the processing unit; and a fourth step for determining a group of pixels as a candidate of a line segment when the pixels in the group are contiguously arrayed and it is determined in the third step that local line segments in the same orientation pass through the respective pixels in the respective local areas using the processing unit.

11. A computer readable product storing at least one program, for detecting a line segment from a contour in a binary contour image, in a storage memory unit, where said at least one program when executed by a processing unit, causes the processing unit and its associated hardware to carry out the steps of:

a first step for counting the numbers of pixels each having a first predetermined value and located in each of a first plurality of sectorial areas around each pixel having the first predetermined value and located at the center of each of a plurality of local areas, and counting the numbers of pixels each having the first predetermined value and located in each of second plurality of sectorial areas around said each pixel having the first predetermined value and located at the center of each of the plurality of local areas, where the locations of the second plurality of sectorial areas are different from the locations of the first plurality of sectorial areas, wherein the pixels are stored in the storage memory unit;

a second step for obtaining an overlapping area in which one of the first plurality of sectorial areas and one of the second plurality of sectorial areas are overlapped, where the number of pixels located in said one of the first plurality of sectorial areas is greater than a second predetermined value, and the number of pixels located in said one of the second plurality of sectorial areas is greater than the second predetermined value, respectively; and for determining that a local line segment exists in an orientation corresponding to said overlapping area using the processing unit;

a third step for determining in each of the plurality of local areas that a straight local line segment passing through said each pixel exists in the local area when two local line segments are determined to exist in the second step, and the orientations of the two local line segments differ by 180° from each other using the processing unit; and a fourth step for determining a group of pixels as a candidate of a line segment when the pixels in the group are contiguously arrayed and it is determined in the fourth step that local line segments in the same orientation pass through the respective pixels in the respective local areas using the processing unit.

12. A computer readable product storing at least one program, for detecting a line segment from a contour in a binary contour image, in a storage memory unit, where said at least one program when executed by a processing unit, causes the processing unit and its associated hardware to carry out the steps of:

a first step for obtaining the numbers of pixels each having a first predetermined value and located in each of a plurality of orientations around each of a plurality of pixels respectively located at the centers of a plurality of local areas and each having said first predetermined value wherein the pixels are stored in the storage memory unit;

a second step for obtaining a difference between the number of pixels located in each orientation and a sum of the numbers of pixels in orientations adjacent to said each orientation on both sides thereof using the processing unit;

a third step for determining that a local line segment exists in a certain orientation when the difference for the orientation is greater than a second predetermined value using the processing unit;

a fourth step for determining in each of the plurality of local areas that a straight local line segment passing through said each of the plurality of pixels exists in the local area when two local line segments are determined to exist in the third step, and the orientations of the two local line segments differ by 180° from each other using the processing unit; and a fifth step for determining a group of pixels as a candidate of a line segment when the pixels in the group are contiguously arrayed and it is determined in the fourth step that local line segments in the same orientation pass through the respective pixels in the respective local areas using the processing unit.

13. A computer readable product storing at least one program, for detecting a line segment from a contour in a binary contour image, in a storage memory unit, where said at least one program when executed by a processing unit, causes the processing unit and its associated hardware to carry out the steps of:

a first step for counting the numbers of pixels each having a first predetermined value and located in each of a plurality of sectorial areas around each of a plurality of pixels respectively located at the centers of a plurality of local areas and each having said first predetermined value, wherein the pixels are stored in the storage memory unit;

a second step for obtaining a difference between the number of pixels located in each area and a sum of the numbers of pixels in orientations adjacent to said each areas on both sides thereof using the processing unit;

a third step for determining that a local line segment exists in an orientation of one of the areas when the difference for the area is greater than a second predetermined value using the processing unit;

a fourth step for determining in each of the plurality of local areas that a straight local line segment passing through said each of the plurality of pixels exists in the local area when two local line segments are determined to exist in the third step, and the orientations of the two local line segments differ by 180° from each other using the processing unit; and a fifth step for determining a group of pixels as a candidate of a line segment when the pixels in the group are contiguously arrayed and it is determined in the fourth step that local line segments in the same orientation pass through the respective pixels in the respective local areas using the processing unit.

14. A computer readable product storing at least one program, for detecting a position of a corner from a contour in a binary contour image, in a storage memory unit, where said at least one program when executed by a processing unit, causes the processing unit and its associated hardware to carry out the steps of:

a first step for obtaining the numbers of pixels each having a first predetermined value and located in each of a plurality of orientations around each of a plurality of pixels respectively located at the centers of a plurality of local areas and each having said first predetermined value, wherein the pixels are stored in the storage memory unit;

a second step for determining in each of the plurality of local areas that a local line segment exists in an orientation corresponding to one of the sectorial areas when the number of pixels located in the sectorial area is greater than a second predetermined value using the processing unit;

a third step for determining in each of the plurality of local areas that the pixel located at the center of the local area is a near-corner point when an absolute value of a difference between 180° and a difference between the orientations of the two local line segments determined in the second step exceeds a predetermined angle value using the processing unit;

a fourth step for obtaining a group of pixels which are determined as the near-corner point, and are arrayed contiguously using the processing unit;

a fifth step for obtaining for each group representative values of the coordinates of the respective pixels in the group using the processing unit;

a sixth step for obtaining for each group as a corner orientation of the near-corner points a mean orientation of the orientations of the two local line segments in the local area containing at the center of the local area each pixel in the group using the processing unit; and a seventh step for obtaining a representative value of the orientations of all of the pixels in each group using the processing unit.

15. A computer readable product storing at least one program, for detecting a position of a corner from a contour in a binary contour image, in a storage memory unit, where said at least one program when executed by a processing unit, causes the processing unit and its associated hardware to carry out the steps of:

a first step for obtaining the numbers of pixels each having a first predetermined value and located in each of a plurality of sectorial areas around each of a plurality of pixels respectively located at the centers of a plurality of local areas and each having said first predetermined value, wherein the pixels are stored in the storage memory unit;

a second step for determining in each of the plurality of local areas that a local line segment exists in an orientation corresponding to one of the sectorial areas when the number of pixels located in the sectorial area is greater than a second predetermined value used in the processing unit;

a third step for determining in each of the plurality of local areas that the pixel located at the center of the local area is a near-corner point when an absolute value of a difference between 180° and a difference between the orientations of the two local line segments determined in the second step exceeds a predetermined angle value used in the processing unit;

a fourth step for obtaining a group of pixels which are determined as the near-corner point, and are arrayed contiguously used in the processing unit;

a fifth step for obtaining for each group representative values of the coordinates of the respective pixels in the group used in the processing unit;

a sixth step for obtaining for each group as a corner orientation of the near-corner points a mean orientation of the orientations of the two local line segments in the local area containing at the center of the local area each pixel in the group used in the processing unit; and a seventh step for obtaining a representative value of the orientations of all of the pixels in each group used in the processing unit.

16. A computer readable product storing at least one program, for detecting a position of a corner from a contour in a binary contour image, in a storage memory unit, where said at least one program when executed by a processing unit, causes the processing unit and its associated hardware to carry out the steps of:

a first step for counting the numbers of pixels each having a first predetermined value and located in each of a first plurality of sectorial areas around each pixel having the first predetermined value and located at the center of each of a plurality of local areas, and counting the numbers of pixels each having the first predetermined value and located in each of a second plurality of sectorial areas around said each pixel having the first predetermined value and located at the center of each of the plurality of local areas, where the locations of the second plurality of sectorial areas are different from the locations of the first plurality of sectorial areas, wherein the pixels are stored in the storage memory unit;

a second step for obtaining two overlapping areas in each of which one of the first plurality of sectorial areas and one of the second plurality of sectorial areas are overlapped, where the number of pixels located in said one of the first plurality of sectorial areas is greater than a second predetermined value, and the number of pixels located in said one of the second plurality of sectorial areas is greater than the second predetermined value, respectively; and for determining that a local line segment exists in each of orientations corresponding to said overlapping area using the processing unit;

a third step for determining in each of the plurality of local areas that the pixel located at the center of the local area is a near-corner point when an absolute value of a difference between 180° and a difference between the orientations of the two local line segments determined in the second step exceeds a predetermined angle value using the processing unit;

a fourth step for obtaining a group of pixels which are determined as the near-corner point, and are arrayed contiguously using the processing unit;

a fifth step for obtaining for each group representative values of the coordinates of the respective pixels in the group using the processing unit;

a sixth step for obtaining for each group as a corner orientation of the near-corner points a mean orientation of the orientations of the two local line segments in the local area containing at the center of the local area each pixel in the group using the processing unit; and a seventh step for obtaining a representative value of the orientations of all of the pixels in each group using the processing unit.

17. A computer readable product storing at least one program, for detecting a position of a corner from a contour in a binary contour image, in a storage memory unit, where said at least one program when executed by a processing unit, causes the processing unit and its associated hardware to carry out the steps of:

a first step for obtaining the numbers of pixels each having a first predetermined value and located in a plurality of orientations around each of a plurality of pixels respectively located at the centers of a plurality of local areas and each having said first predetermined value, wherein the pixels are stored in the storage memory unit;

a second step for obtaining a difference between the number of pixels located in each orientation and a sum of the numbers of pixels in orientations adjacent to said each orientation on both sides thereof using the central processing unit;

a third step for determining that a local line segment exists in a certain orientation when the difference for the orientation is greater than a second predetermined value using the processing unit;

a fourth step for determining in each of the plurality of local areas that the pixel located at the center of the local area is a near-corner point when an absolute value of a difference between 180° and a difference between the orientations of the two local line segments determined in the second and third steps exceeds a predetermined angle value using the processing unit;

a fifth step for obtaining a group of pixels which are determined as the near-corner point, and are arrayed contiguously using the processing unit;

a sixth step for obtaining for each group representative values of the coordinates of the respective pixels in the group using the processing unit;

a seventh step for obtaining for each group as a corner orientation of the near-corner points a mean orientation of the orientations of the two local line segments in the local area containing at the center of the local area each pixel in the group using the processing unit; and an eighth step for obtaining a representative value of the orientations of all of the pixels in each group using the processing unit.

18. A computer readable product storing at least one program, for detecting a position of a corner from a contour in a binary contour image, in a storage memory unit, where said at least one program when executed by a processing unit, causes the processing unit and its associated hardware to carry out the steps of:

a first step for obtaining the numbers of pixels each having a first predetermined value and located in each of a plurality of sectorial areas around each of a plurality of pixels respectively located at the centers of a plurality of local areas-and each having said first predetermined value, wherein the pixels are stored in the storage memory unit;

a second step for obtaining a difference between the number of pixels located in each sectorial area and a sum of the numbers of pixels in sectorial areas adjacent to said each sectorial area on both sides thereof using the processing unit;

a third step for determining that a local line segment exists in an orientation corresponding to a sectorial area when the difference for the sectorial area is greater than a second predetermined value using the processing unit;

a fourth step for determining in each of the plurality of local areas that the pixel located at the center of the local area is a near-corner point when an absolute value of a difference between 180° and a difference between the orientations of the two local line segments determined in the second and third steps exceeds a predetermined angle value using the processing unit;

a fifth step for obtaining a group of pixels which are determined as the near-corner point, and are arrayed contiguously using the processing unit;

a sixth step for obtaining for each group representative values of the coordinates of the respective pixels in the group using the processing unit;

a seventh step for obtaining for each group as a corner orientation of the near-corner points a mean orientation of the orientations of the two local line segments in the local area containing at the center of the local area each pixel in the group using the processing unit; and an eighth step for obtaining a representative value of the orientations of all of the pixels in each group using the processing unit.

19. A computer readable product storing at least one program, for detecting a line segment from a contour in a binary contour image, in a storage memory unit, where said at least one program when executed by a processing unit, causes the processing unit and its associated hardware to carry out the steps of:

a first step for counting the numbers of pixels having a first predetermined value and located in a plurality of sectorial areas which are arranged around each of a plurality of pixels located in the binary contour image and having the first predetermined value, wherein the pixels are stored in the storage memory unit;

a second step for determining for each of the plurality of pixels located in the binary contour image and having the first predetermined value, that a local line segment exists in an orientation, corresponding to one of the sectorial areas, from said each of the plurality of pixels, when the number of pixels located in the sectorial area is greater than a second predetermined value using the processing unit;

a third step for determining for each of the plurality of pixels located in the binary contour image and having the first predetermined value, that first and second local line segments which are determined to exist in the second step constitute a straight local line segment passing through said each of the plurality of pixels when the orientations of said first and second local line segments differ by 180° from each other using the processing unit;

a fourth step for determining for each of the plurality of pixels located in the binary contour image and having the first predetermined value, that third and fourth local line segments constitute a nearly-straight local line segment corresponding to the straight local line segment obtained in the third step when the orientation of the third local line segment is within a predetermined range of azimuth from the orientation of one of the said first and second local line segments constituting the straight local line segment determined in the third step, the orientation of the fourth local line segment is within a predetermined range of azimuth from the orientation of the other of said first and second local line segments, and the difference between the orientations of the above third and fourth local line segments is not equal to 180° using the processing unit; and a fifth step for determining a series of pixels as constituents of a candidate of a line segment when the pixels in the series are contiguously arrayed, at least one of the pixels in the series is the pixel through which the straight local line segment is determined in the third step to pass, the respective orientation of at least one straight local line segment which is determined to pass through said at least one of the pixels in the series is the same, and a nearly-straight local line segment, corresponding to said straight local line segment which is determined to exist in the third step for one of said at least one of the pixels, is determined in the fourth step for each of the pixels other than said at least one pixel in the series using the processing unit.

20. A computer readable product storing at least one program, for determining an orientation of a local line segment in a contour in a local area of a binary contour image, in a storage memory unit, where said at least one program when executed by a processing unit, causes the processing unit and its associated hardware to carry out the steps of:

obtaining the numbers of pixels located in a plurality of orientations around one of plural pixels located in the local area and having a predetermined value, wherein the pixels are stored in the storage memory unit;

obtaining a sum of the numbers of pixels in orientations adjacent to each of the plurality of orientations on both sides thereof;

obtaining a difference between the number of pixels located in said each orientation and said sum using the processing unit; and determining that local line segments exist in two orientations among said plurality of orientations when said difference obtained in the third step is the largest and the second largest in said two orientations, respectively, using the processing unit.

21. A computer readable product storing at least one program, for determining an orientation of a local line segment in a contour in a local area of a binary contour image, in a storage memory unit, where said at least one program when executed by a processing unit, causes the processing unit and its associated hardware to carry out the steps of:

a first step for obtaining the numbers of pixels each located in a plurality of orientations around one of plural pixels located in the local area, wherein the pixels are stored in the storage memory unit; and a second step for determining that a local line segment exists in an orientation in which the number of pixels located in the orientation is greater than predetermined value, wherein the pixels are stored in the storage memory unit.

22. A program executing machine containing a computer readable product storing at least one program, which when executed by the program executing machine, causes the program executing machine and its associated hardware to carry out the steps of:

a first step for obtaining the numbers of pixels each having a first predetermined value and located in a plurality of orientations around one of plural pixels, located in the local area and having said first predetermined value, wherein the pixels are stored in the storage memory unit; and a second step for determining that a local line segment exists in an orientation in which the number of pixels located in the orientation is greater than a second predetermined value using the processing unit.

23. A program executing machine containing a computer readable product storing at least one program, which when executed by the program executing machine, causes the program executing machine and its associated hardware to carry out the steps of:

a first step for obtaining the numbers of pixels each having a first predetermined value and located in a plurality of orientations around each of a plurality of pixels respectively located at the centers of a plurality of local areas and each having said first predetermined value, wherein the pixels are stored in the storage memory unit; and a second step for determining in each of the plurality of local areas that a local line segment exists in an orientation in which the number of pixels located in the orientation is greater than a second predetermined value using the processing unit.

24. A program executing machine containing a computer readable product storing at least one program, which when executed by the program executing machine, causes the program executing machine and its associated hardware to carry out the steps of:

a first step for obtaining the numbers of pixels located in a plurality of orientations around one of plural pixels, located in the local area and having a first predetermined value, wherein the pixels are stored in a storage memory unit;

a second step for determining whether or not the number of pixels located in each orientation is greater than a sum of the numbers of pixels in orientations adjacent to said each orientation on both sides thereof using the processing unit; and a third step for determining that a local line segment exists in said each orientation when the number of pixels located in each orientation is greater than a sum of the numbers of pixels in orientations adjacent to said each orientation on both sides thereof using the processing unit.

25. A program executing machine containing a computer readable product storing at least one program, which when executed by the program executing machine, causes the program executing machine and its associated hardware to carry out the steps of:

a first step for obtaining the numbers of pixels each having a first predetermined value and located in a plurality of orientations around each of a plurality of pixels respectively located at the centers of a plurality of local areas and each having said first predetermined value, wherein the pixels are stored in the storage memory unit; and a second step for determining whether or not the number of pixels located in each orientation is greater than a sum of the numbers of pixels in orientations adjacent to said each orientation on both sides thereof using the processing unit; and a third step for determining that a local line segment exists in said each orientation when the number of pixels located in each orientation is greater than a sum of the numbers of pixels in orientations adjacent to said each orientation on both sides thereof using the processing unit.

26. A program executing machine containing a computer readable product storing at least one program, which when executed by the program executing machine, causes the program executing machine and its associated hardware to carry out the steps of:

a first step for obtaining the numbers of pixels located in a plurality of orientations around one of plural pixels located in the local area and having a first predetermined value, wherein the pixels are stored in the storage memory unit;

a second step for obtaining a difference between the number of pixels located in each orientation and a sum of the numbers of pixels in orientations adjacent to said each orientation on both sides thereof using the processing unit; and a third step for determining that a local line segment exists in a certain orientation when the difference for the orientation is greater than a second predetermined value using the processing unit.

27. A program executing machine containing a computer readable product storing at least one program, which when executed by the program executing machine, causes the program executing machine and its associated hardware to carry out the steps of:

a first step for obtaining the numbers of pixels each having a first predetermined value and located in a plurality of orientations around each of a plurality of pixels respectively located at the centers of a plurality of local areas and each having said first predetermined value, wherein the pixels are stored in the storage memory unit; and a second step for obtaining a difference between the number of pixels located in each orientation and a sum of the numbers of pixels in orientations adjacent to said each orientation on both sides thereof using the processing unit; and a third step for determining that a local line segment exists in a certain orientation when the difference for the orientation is greater than a second predetermined value using the processing unit.

28. A program executing machine containing a computer readable product storing at least one program, which when executed by the program executing machine, causes the program executing machine and its associated hardware to carry out the steps of:

a first step for counting the numbers of pixels each having a first predetermined value and located in each of a first plurality of sectorial areas around each pixel having the first predetermined value and located at the center of each of a plurality of local areas, and counting the numbers of pixels each having the first predetermined value and located in each of a second plurality of sectorial areas around said each pixel having the first predetermined value and located at the center of each of the plurality of local areas, where the locations of the second plurality of sectorial areas are different from the locations of the first plurality of sectorial areas, wherein the pixels are stored in the storage memory unit;

a second step for obtaining for each of the first and second patterns a difference between the number of pixels located in each orientation and a sum of the numbers of pixels in orientations adjacent to said each orientation on both sides thereof using the processing unit;

a third step for obtaining for each of the first and second patterns an orientation corresponding to one of the areas for which the difference is greater than a second predetermined value using the processing unit; and a fourth step for obtaining an overlapping area in which one of the first plurality of sectorial areas and one of the second plurality of sectorial areas are overlapped, where the number of pixels located in said one of the first plurality of sectorial areas is greater than the second predetermined value, and the number of pixels located in said one of the second plurality of sectorial areas is greater than the second predetermined value, respectively; and for determining that a local line segment exists in an orientation corresponding to said overlapping area using the processing unit.

29. A program executing machine containing a computer readable product storing at least one program, which when executed by the program executing machine, causes the program executing machine and its associated hardware to carry out the steps of:

a first step for obtaining the numbers of pixels each having a first predetermined value and located in each of a plurality of orientations around each of a plurality of pixels respectively located at the centers of a plurality of local areas and each having said first predetermined value wherein the pixels are stored in the storage memory unit;

a second step for determining in each of the plurality of local areas that a local line segment exists in a certain orientation when the number of pixels located in the orientation is greater than a second predetermined value using the processing unit;

a third step for determining in each of the plurality of local areas that a straight local line segment passing through said each of the plurality of pixels exists in the local area when two local line segments are determined to exist in the second step, and the orientations of the two local line segments differ by 180° from each other using the processing unit; and a fourth step for determining a group of pixels as a candidate of a line segment when the pixels in the group are contiguously arrayed and it is determined in the third step that local line segments in the same orientation pass through the respective pixels in the respective local areas using the processing unit.

30. A program executing machine containing a computer readable product storing at least one program, which when executed by the program executing machine, causes the program executing machine and its associated hardware to carry out the steps of:

a first step for counting the numbers of pixels each having a first predetermined value and located in each of a plurality of sectorial areas around each of a plurality of pixels respectively located at the centers of a plurality of local areas and each having said first predetermined value, wherein the pixels are stored in the storage memory unit;

a second step for determining in each of the plurality of local areas that a local line segment exists in an orientation corresponding to one of the sectorial areas when the number of pixels located in the sectorial area is greater than a second predetermined value using the processing unit;

a third step for determining in each of the plurality of local areas that a straight local line segment passing through said each of the plurality of pixels exists in the local area when two local line segments are determined to exist in the second step, and the orientations of the two local line segments differ by 180° from each other using the processing unit; and a fourth step for determining a group of pixels as a candidate of a line segment when the pixels in the group are contiguously arrayed and it is determined in the third step that local line segments in the same orientation pass through the respective pixels in the respective local areas using the processing unit.

31. A program executing machine containing a computer readable product storing at least one program, which when executed by the program executing machine, causes the program executing machine and its associated hardware to carry out the steps of:

a first step for counting the numbers of pixels each having a first predetermined value and located in each of a first plurality of sectorial areas around each pixel having the first predetermined value and located at the center of each of a plurality of local areas, and counting the numbers of pixels each having the first predetermined value and located in each of second plurality of sectorial areas around said each pixel having the first predetermined value and located at the center of each of the plurality of local areas, where the locations of the second plurality of sectorial areas are different from the locations of the first plurality of sectorial areas, wherein the pixels are stored in the storage memory unit;

a second step for obtaining an overlapping area in which one of the first plurality of sectorial areas and one of the second plurality of sectorial areas are overlapped, where the number of pixels located in said one of the first plurality of sectorial areas is greater than a second predetermined value, and the number of pixels located in said one of the second plurality of sectorial areas is greater than the second predetermined value, respectively; and for determining that a local line segment exists in an orientation corresponding to said overlapping area using the processing unit;

a third step for determining in each of the plurality of local areas that a straight local line segment passing through said each pixel exists in the local area when two local line segments are determined to exist in the second step, and the orientations of the two local line segments differ by 180° from each other using the processing unit; and a fourth step for determining a group of pixels as a candidate of a line segment when the pixels in the group are contiguously arrayed and it is determined in the fourth step that local line segments in the same orientation pass through the respective pixels in the respective local areas using the processing unit.

32. A program executing machine containing a computer readable product storing at least one program, which when executed by the program executing machine, causes the program executing machine and its associated hardware to carry out the steps of:

a first step for obtaining the numbers of pixels each having a first predetermined value and located in each of a plurality of orientations around each of a plurality of pixels respectively located at the centers of a plurality of local areas and each having said first predetermined value wherein the pixels are stored in the storage memory unit;

a second step for obtaining a difference between the number of pixels located in each orientation and a sum of the numbers of pixels in orientations adjacent to said each orientation on both sides thereof using the processing unit;

a third step for determining that a local line segment exists in a certain orientation when the difference for the orientation is greater than a second predetermined value using the processing unit;

a fourth step for determining in each of the plurality of local areas that a straight local line segment passing through said each of the plurality of pixels exists in the local area when two local line segments are determined to exist in the third step, and the orientations of the two local line segments differ by 180° from each other using the processing unit; and a fifth step for determining a group of pixels as a candidate of a line segment when the pixels in the group are contiguously arrayed and it is determined in the fourth step that local line segments in the same orientation pass through the respective pixels in the respective local areas using the processing unit.

33. A program executing machine containing a computer readable product storing at least one program, which when executed by the program executing machine, causes the program executing machine and its associated hardware to carry out the steps of:

a first step for counting the numbers of pixels each having a first predetermined value and located in each of a plurality of sectorial areas around each of a plurality of pixels respectively located at the centers of a plurality of local areas and each having said first predetermined value, wherein the pixels are stored in the storage memory unit;

a second step for obtaining a difference between the number of pixels located in each area and a sum of the numbers of pixels in orientations adjacent to said each areas on both sides thereof using the processing unit;

a third step for determining that a local line segment exists in an orientation of one of the areas when the difference for the area is greater than a second predetermined value using the processing unit;

a fourth step for determining in each of the plurality of local areas that a straight local line segment passing through said each of the plurality of pixels exists in the local area when two local line segments are determined to exist in the third step, and the orientations of the two local line segments differ by 180° from each other using the processing unit; and a fifth step for determining a group of pixels as a candidate of a line segment when the pixels in the group are contiguously arrayed and it is determined in the fourth step that local line segments in the same orientation pass through the respective pixels in the respective local areas using the processing unit.

34. A program executing machine containing a computer readable product storing at least one program, which when executed by the program executing machine, causes the program executing machine and its associated hardware to carry out the steps of:

a first step for obtaining the numbers of pixels each having a first predetermined value and located in each of a plurality of orientations around each of a plurality of pixels respectively located at the centers of a plurality of local areas and each having said first predetermined value, wherein the pixels are stored in the storage memory unit;

a second step for determining in each of the plurality of local areas that a local line segment exists in an orientation corresponding to one of the sectorial areas when the number of pixels located in the sectorial area is greater than a second predetermined value using the processing unit;

a third step for determining in each of the plurality of local areas that the pixel located at the center of the local area is a near-corner point when an absolute value of a difference between 180° and a difference between the orientations of the two local line segments determined in the second step exceeds a predetermined angle value using the processing unit;

a fourth step for obtaining a group of pixels which are determined as the near-corner point, and are arrayed contiguously using the processing unit;

a fifth step for obtaining for each group representative values of the coordinates of the respective pixels in the group using the processing unit;

a sixth step for obtaining for each group as a corner orientation of the near-corner points a mean orientation of the orientations of the two local line segments in the local area containing at the center of the local area each pixel in the group using the processing unit; and a seventh step for obtaining a representative value of the orientations of all of the pixels in each group using the processing unit.

35. A program executing machine containing a computer readable product storing at least one program, which when executed by the program executing machine, causes the program executing machine and its associated hardware to carry out the steps of:

a first step for obtaining the numbers of pixels each having a first predetermined value and located in each of a plurality of sectorial areas around each of a plurality of pixels respectively located at the centers of a plurality of local areas and each having said first predetermined value, wherein the pixels are stored in the storage memory unit;

a second step for determining in each of the plurality of local areas that a local line segment exists in an orientation corresponding to one of the sectorial areas when the number of pixels located in the sectorial area is greater than a second predetermined value used in the processing unit;

a third step for determining in each of the plurality of local areas that the pixel located at the center of the local area is a near-corner point when an absolute value of a difference between 180° and a difference between the orientations of the two local line segments determined in the second step exceeds a predetermined angle value used in the processing unit;

a fourth step for obtaining a group of pixels which are determined as the near-corner point, and are arrayed contiguously used in the processing unit;

a fifth step for obtaining for each group representative values of the coordinates of the respective pixels in the group used in the processing unit;

a sixth step for obtaining for each group as a corner orientation of the near-corner points a mean orientation of the orientations of the two local line segments in the local area containing at the center of the local area each pixel in the group used in the processing unit; and a seventh step for obtaining a representative value of the orientations of all of the pixels in each group used in the processing unit.

36. A program executing machine containing a computer readable product storing at least one program, which when executed by the program executing machine, causes the program executing machine and its associated hardware to carry out the steps of:

a first step for counting the numbers of pixels each having a first predetermined value and located in each of a first plurality of sectorial areas around each pixel having the first predetermined value and located at the center of each of a plurality of local areas, and counting the numbers of pixels each having the first predetermined value and located in each of a second plurality of sectorial areas around said each pixel having the first predetermined value and located at the center of each of the plurality of local areas, where the locations of the second plurality of sectorial areas are different from the locations of the first plurality of sectorial areas, wherein the pixels are stored in the storage memory unit;

a second step for obtaining two overlapping areas in each of which one of the first plurality of sectorial areas and one of the second plurality of sectorial areas are overlapped, where the number of pixels located in said one of the first plurality of sectorial areas is greater than a second predetermined value, and the number of pixels located in said one of the second plurality of sectorial areas is greater than the second predetermined value, respectively; and for determining that a local line segment exists in each of orientations corresponding to said overlapping area using the processing unit;

a third step for determining in each of the plurality of local areas that the pixel located at the center of the local area is a near-corner point when an absolute value of a difference between 180° and a difference between the orientations of the two local line segments determined in the second step exceeds a predetermined angle value using the processing unit;

a fourth step for obtaining a group of pixels which are determined as the near-corner point, and are arrayed contiguously using the processing unit;

a fifth step for obtaining for each group representative values of the coordinates of the respective pixels in the group using the processing unit;

a sixth step for obtaining for each group as a corner orientation of the near-corner points a mean orientation of the orientations of the two local line segments in the local area containing at the center of the local area each pixel in the group using the processing unit; and a seventh step for obtaining a representative value of the orientations of all of the pixels in each group using the processing unit.

37. A program executing machine containing a computer readable product storing at least one program, which when executed by the program executing machine, causes the program executing machine and its associated hardware to carry out the steps of:

a first step for obtaining the numbers of pixels each having a first predetermined value and located in a plurality of orientations around each of a plurality of pixels respectively located at the centers of a plurality of local areas and each having said first predetermined value, wherein the pixels are stored in the storage memory unit;

a second step for obtaining a difference between the number of pixels located in each orientation and a sum of the numbers of pixels in orientations adjacent to said each orientation on both sides thereof using the central processing unit;

a third step for determining that a local line segment exists in a certain orientation when the difference for the orientation is greater than a second predetermined value using the processing unit;

a fourth step for determining in each of the plurality of local areas that the pixel located at the center of the local area is a near-corner point when an absolute value of a difference between 180° and a difference between the orientations of the two local line segments determined in the second and third steps exceeds a predetermined angle value using the processing unit;

a fifth step for obtaining a group of pixels which are determined as the near-corner point, and are arrayed contiguously using the processing unit;

a sixth step for obtaining for each group representative values of the coordinates of the respective pixels in the group using the processing unit;

a seventh step for obtaining for each group as a corner orientation of the near-corner points a mean orientation of the orientations of the two local line segments in the local area containing at the center of the local area each pixel in the group using the processing unit; and an eighth step for obtaining a representative value of the orientations of all of the pixels in each group using the processing unit.

38. A program executing machine containing a computer readable product storing at least one program, which when executed by the program executing machine, causes the program executing machine and its associated hardware to carry out the steps of:

a first step for obtaining the numbers of pixels each having a first predetermined value and located in each of a plurality of sectorial areas around each of a plurality of pixels respectively located at the centers of a plurality of local areas-and each having said first predetermined value, wherein the pixels are stored in the storage memory unit;

a second step for obtaining a difference between the number of pixels located in each sectorial area and a sum of the numbers of pixels in sectorial areas adjacent to said each sectorial area on both sides thereof using the processing unit;

a third step for determining that a local line segment exists in an orientation corresponding to a sectorial area when the difference for the sectorial area is greater than a second predetermined value using the processing unit;

a fourth step for determining in each of the plurality of local areas that the pixel located at the center of the local area is a near-corner point when an absolute value of a difference between 180° and a difference between the orientations of the two local line segments determined in the second and third steps exceeds a predetermined angle value using the processing unit;

a fifth step for obtaining a group of pixels which are determined as the near-corner point, and are arrayed contiguously using the processing unit;

a sixth step for obtaining for each group representative values of the coordinates of the respective pixels in the group using the processing unit;

a seventh step for obtaining for each group as a corner orientation of the near-corner points a mean orientation of the orientations of the two local line segments in the local area containing at the center of the local area each pixel in the group using the processing unit; and an eighth step for obtaining a representative value of the orientations of all of the pixels in each group using the processing unit.

39. A program executing machine containing a computer readable product storing at least one program, which when executed by the program executing machine, causes the program executing machine and its associated hardware to carry out the steps of:

a first step for counting the numbers of pixels having a first predetermined value and located in a plurality of sectorial areas which are arranged around each of a plurality of pixels located in the binary contour image and having the first predetermined value, wherein the pixels are stored in the storage memory unit;

a second step for determining for each of the plurality of pixels located in the binary contour image and having the first predetermined value, that a local line segment exists in an orientation, corresponding to one of the sectorial areas, from said each of the plurality of pixels, when the number of pixels located in the sectorial area is greater than a second predetermined value using the processing unit;

a third step for determining for each of the plurality of pixels located in the binary contour image and having the first predetermined value, that first and second local line segments which are determined to exist in the second step constitute a straight local line segment passing through said each of the plurality of pixels when the orientations of said first and second local line segments differ by 180° from each other using the processing unit;

a fourth step for determining for each of the plurality of pixels located in the binary contour image and having the first predetermined value, that third and fourth local line segments constitute a nearly-straight local line segment corresponding to the straight local line segment obtained in the third step when the orientation of the third local line segment is within a predetermined range of azimuth from the orientation of one of the said first and second local line segments constituting the straight local line segment determined in the third step,
the orientation of the fourth local line segment is within a predetermined range of azimuth from the orientation of the other of said first and second local line segments, and the difference between the orientations of the above third and fourth local line segments is not equal to 180° using the processing unit; and a fifth step for determining a series of pixels as constituents of a candidate of a line segment when the pixels in the series are contiguously arrayed, at least one of the pixels in the series is the pixel through which the straight local line segment is determined in the third step to pass, the respective orientation of at least one straight local line segment which is determined to pass through said at least one of the pixels in the series is the same, and a nearly-straight local line segment, corresponding to said straight local line segment which is determined to exist in the third step for one of said at least one of the pixels, is determined in the fourth step for each of the pixels other than said at least one pixel in the series using the processing unit.

40. A program executing machine containing a computer readable product storing at least one program, which when executed by the program executing machine, causes the program executing machine and its associated hardware to carry out the steps of:

obtaining the numbers of pixels located in a plurality of orientations around one of plural pixels located in the local area and having a predetermined value, wherein the pixels are stored in the storage memory unit;

obtaining a sum of the numbers of pixels in orientations adjacent to each of the plurality of orientations on both sides thereof;

obtaining a difference between the number of pixels located in said each orientation and said sum using the processing unit; and determining that local line segments exist in two orientations among said plurality of orientations when said difference obtained in the third step is the largest and the second largest in said two orientations, respectively, using the processing unit.

41. A program executing machine containing a computer readable product storing at least one program, which when executed by the program executing machine, causes the program executing machine and its associated hardware to carry out the steps of:

a first step for obtaining the numbers of pixels each located in a plurality of orientations around one of plural pixels located in the local area, wherein the pixels are stored in the storage memory unit; and a second step for determining that a local line segment exists in an orientation in which the number of pixels located in the orientation is greater than predetermined value, wherein the pixels are stored in the storage memory unit.

* * * * *

UNITED STATES PATENT AND TRADEMARK OFFICE
CERTIFICATE OF CORRECTION

PATENT NO.   : 5,668,893                                    Page 1 of 2
DATED        : September 16, 1997
INVENTOR(S)  : KANDA et al.

It is certified that error appears in the above-identified patent and that said Letters Patent is hereby corrected as shown below:

Title page, under "U.S. PATENT DOCUMENTS", add:

| | | |
|---|---|---|
| 5,267,328 | 11/1993 | Gouge |
| 4,926,492 | 05/1990 | Tanaka et al. |
| 4,876,726 | 10/1989 | Capello et al. |
| 4,769,850 | 09/1988 | Itoh et al. |
| 4,547,895 | 10/1985 | Mita et al. |
| 4,513,444 | 04/1985 | Okai et al. |
| 4,310,827 | 01/1982 | Asai |

Title page, right column, add:

FOREIGN PATENT DOCUMENTS

| | | |
|---|---|---|
| 57-182877 | 11/1982 | Japan |
| 59-49071 | 03/1984 | Japan |
| 62-125481 | 06/1987 | Japan |
| 3-175591 | 07/1991 | Japan |
| 2 147 474 | 05/1985 | United Kingdom |

Col. 1,   line 6, change "division" to --continuation--.

Col. 3,   line 1, change "lime" to --line--.

Col. 5,   line 67, change "the-respective" to --the respective--.

UNITED STATES PATENT AND TRADEMARK OFFICE
CERTIFICATE OF CORRECTION

PATENT NO. : 5,668,893
DATED : September 16, 1997
INVENTOR(S) : KANDA et al.

It is certified that error appears in the above-identified patent and that said Letters Patent is hereby corrected as shown below:

Col. 6, line 26, change "9" to --9A--;
line 27, after "and" insert --Fig. 9B is--.

Col. 10, line 1, change ")" to --,--;
line 29, change "74" to --$\theta$--.

Col. 15, line 19, after "pixels" (second occurrence) insert --,--.

Col. 36, line 53, change "areas-and" to --areas and--.

Signed and Sealed this

Twenty-fourth Day of March, 1998

Attest:

BRUCE LEHMAN

Attesting Officer

Commissioner of Patents and Trademarks